US010334652B2

United States Patent
Rahman et al.

(10) Patent No.: US 10,334,652 B2
(45) Date of Patent: Jun. 25, 2019

(54) METHODS AND APPARATUSES FOR DETERMINING UNSYNCHRONIZED OR SYNCHRONIZED DUAL CONNECTIVITY MODE OF A USER EQUIPMENT

(71) Applicant: Telefonaktiebolaget LM Ericsson (publ), Stockholm (SE)

(72) Inventors: Imadur Rahman, Sollentuna (SE); Muhammad Kazmi, Sundbyberg (SE); Iana Siomina, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 29 days.

(21) Appl. No.: 15/527,157

(22) PCT Filed: Nov. 18, 2015

(86) PCT No.: PCT/SE2015/051244
§ 371 (c)(1),
(2) Date: May 16, 2017

(87) PCT Pub. No.: WO2016/080899
PCT Pub. Date: May 26, 2016

(65) Prior Publication Data
US 2017/0366313 A1 Dec. 21, 2017

Related U.S. Application Data

(60) Provisional application No. 62/081,269, filed on Nov. 18, 2014.

(51) Int. Cl.
*H04L 5/00* (2006.01)
*H04W 72/08* (2009.01)
(Continued)

(52) U.S. Cl.
CPC .......... *H04W 76/15* (2018.02); *H04W 56/00* (2013.01); *H04W 56/001* (2013.01);
(Continued)

(58) Field of Classification Search
CPC .. H04L 5/0032; H04L 5/001; H04W 72/0446; H04W 56/001; H04W 72/085;
(Continued)

(56) References Cited

U.S. PATENT DOCUMENTS

| | | | | |
|---|---|---|---|---|
| 2013/0324163 | A1* | 12/2013 | Werner | G01S 5/0252 455/456.6 |
| 2017/0048108 | A1* | 2/2017 | Yi | H04W 56/00 |
| 2017/0295568 | A1* | 10/2017 | Takeda | H04W 16/32 |

OTHER PUBLICATIONS

Unknown, Author, "Analysis on synchronised and unsynchronised scenario in Dual Connectivity", 3GPP TSG-RAN WG4 Meeting #72, R4-144498, Dresden, Germany, Aug. 18-22, 2014, 1-3.
(Continued)

*Primary Examiner* — Faisal Choudhury
(74) *Attorney, Agent, or Firm* — Sage Patent Group

(57) ABSTRACT

There is disclosed a method for operating a network node in a cellular communication network. The method comprises observing or estimating, for a user equipment in a dual connectivity operation, a length of a measurement gap (Mg) and/or length of serving cell interruption (Tint) caused by the UE on at least one serving cell. The method also comprises comparing the Mg and/or Tint with respective thresholds, and determining whether the UE operates in unsynchronized or synchronized DC mode based on the comparison. There are also disclosed further related methods and devices.

3 Claims, 6 Drawing Sheets

(51) Int. Cl.
    *H04W 72/04*     (2009.01)
    *H04W 56/00*     (2009.01)
    *H04W 76/15*     (2018.01)
    *H04W 8/24*     (2009.01)
    *H04W 36/00*     (2009.01)
    *H04W 36/04*     (2009.01)
    *H04W 72/12*     (2009.01)
    *H04W 84/04*     (2009.01)

(52) U.S. Cl.
    CPC ... *H04W 56/0065* (2013.01); *H04W 72/0446* (2013.01); *H04W 72/085* (2013.01); *H04L 5/001* (2013.01); *H04L 5/0032* (2013.01); *H04W 8/24* (2013.01); *H04W 36/0027* (2013.01); *H04W 36/0069* (2018.08); *H04W 36/0083* (2013.01); *H04W 36/04* (2013.01); *H04W 72/12* (2013.01); *H04W 84/045* (2013.01)

(58) Field of Classification Search
    CPC ......... H04W 56/0065; H04W 36/0027; H04W 84/045; H04W 76/15; H04W 56/00; H04W 8/24; H04W 36/0083; H04W 36/04; H04W 72/12; H04W 36/0069
    USPC ........................................................ 370/336
    See application file for complete search history.

(56) References Cited

OTHER PUBLICATIONS

Unknown, Author, "Summary of email discussion [78-08] : Clarification on synchronous/asynchronous scenario for DC", 3GPP TSG RAN WG1 Meeting #78,R1-144031, Dresden, Germany, LG Electronics, Aug. 18-22, 2014, 1-20.

Unknown, Author, "UE capability signaling for dual connectivity", 3GPP TSG-RAN WG2 #87bis, R2-144142, Shanghai, China, Intel Corporation, Oct. 6-10, 2014, 1-3.

Unknown, Author, "Unsynchronized dual connectivity operation", 3GPP TSG-RAN WG4 Meeting #71-AH on Rel-12 RRM, R4-71AH-0034, Beijing, P.R. China, Ericsson, Jun. 24-26, 2014, 1-5.

* cited by examiner

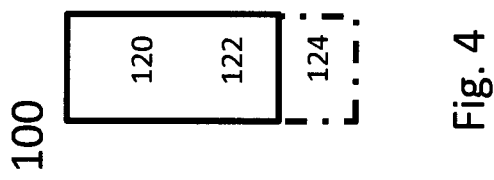

US 10,334,652 B2

METHODS AND APPARATUSES FOR DETERMINING UNSYNCHRONIZED OR SYNCHRONIZED DUAL CONNECTIVITY MODE OF A USER EQUIPMENT

TECHNICAL FIELD

The present disclosure pertains to wireless communication technology, in particular to dual connectivity.

BACKGROUND

Modern wireless communication systems, in particular cellular systems, increasingly allow usage of multiple connections, e.g. multiple cells and/or multiple transmission channels, to provide higher data throughput and/or more reliable communication. Dual connectivity is a form of multiple connectivity in which a user equipment or terminal is connected for communication with two different network nodes. For operating in dual connectivity, the level of synchronization between the network nodes plays an important role. The level of synchronization of a user equipment in dual connectivity may change depending on changes of operational conditions, e.g. movement of the user equipment, and/or changes in interference or load in the cells used for dual connectivity.

SUMMARY

It is an object of the present disclosure to provide improved dual connectivity behavior, in particular in the context of changing operational conditions.

There is disclosed a method for operating a network node in a cellular communication network. The method comprises observing or estimating, for a user equipment in a dual connectivity operation, a length of a measurement gap (Mg) and/or length of serving cell interruption (Tint) caused by the UE on at least one serving cell. The method also comprises comparing the Mg and/or Tint with respective thresholds, and determining whether the UE operates in unsynchronized or synchronized DC mode based on the comparison.

Moreover, a network node for a cellular communication network is disclosed. The network node is adapted for observing or estimating, for a user equipment (UE) in a dual connectivity operation, a length of a measurement gap (Mg) and/or length of serving cell interruption (Tint) caused by the UE on at least one serving cell. The network node is further adapted for comparing the Mg and/or Tint with respective thresholds and for determining whether the UE actually operates in unsynchronized or synchronized DC mode based on the comparison.

There may also be considered a method for operating a user equipment (UE) in dual connectivity operation in a cellular communication network. The method comprises estimating a maximum received time difference (MRTD) of signals from subframe boundaries of a Master Cell Group (MCG) and a Secondary Cell Group (SCG) at the UE and comparing the MRTD with a threshold. Moreover, the method comprises determining whether the UE operates in unsynchronized or synchronized DC mode based on the comparison of MRTD.

A user equipment (UE) for a cellular communication network is also considered. The UE is adapted for, in dual connectivity operation, estimating a maximum received time difference (MRTD) of signals from subframe boundaries of a Master Cell Group (MCG) and a Secondary Cell Group (SCG) at the UE, and comparing the MRTD with a threshold. The UE is also adapted for determining whether the UE operates in unsynchronized or synchronized DC mode based on the comparison of MRTD.

In addition, there is suggested a program product comprising code executable by control circuitry, the code causing the control circuitry to carry out and/or control any of the methods disclosed herein.

Furthermore, there is proposed a carrier medium arrangement carrying and/or storing a program product as disclosed herein, and/or code executable by control circuitry, the code causing the control circuitry to perform and/or control any of the methods disclosed herein.

Approaches disclosed herein allow the UE and/or the network node to determine in which synchronization mode a UE in dual connectivity actually operates. This allows for example to determine cases in which the UE is configured for operation in one mode, but due to operational conditions should or could be in the other mode. This may for example occur if the UE moves such that a time difference of incoming signals from two network nodes providing the dual connectivity signals, e.g. MeNB and SeNB, changes, for example putting the UE into a synchronized mode, while it is configured for unsynchronized mode, or vice versa. Thus, in the context of this disclosure, it should be noted that the mode the UE is configured for (configured mode) is not necessarily identical to the mode it is actually operating in (operational mode). However, approaches of this disclosure allow determining and, consequently, avoiding or ameliorating such a mismatch of operational mode and configured mode.

BRIEF DESCRIPTION OF THE DRAWINGS

The drawings are provided for illustrative purposes, and are not intended to limit the approaches to the embodiments shown.

FIG. 4 schematically shows an example for a network node or base station;

DETAILED DESCRIPTION

Figure 1:
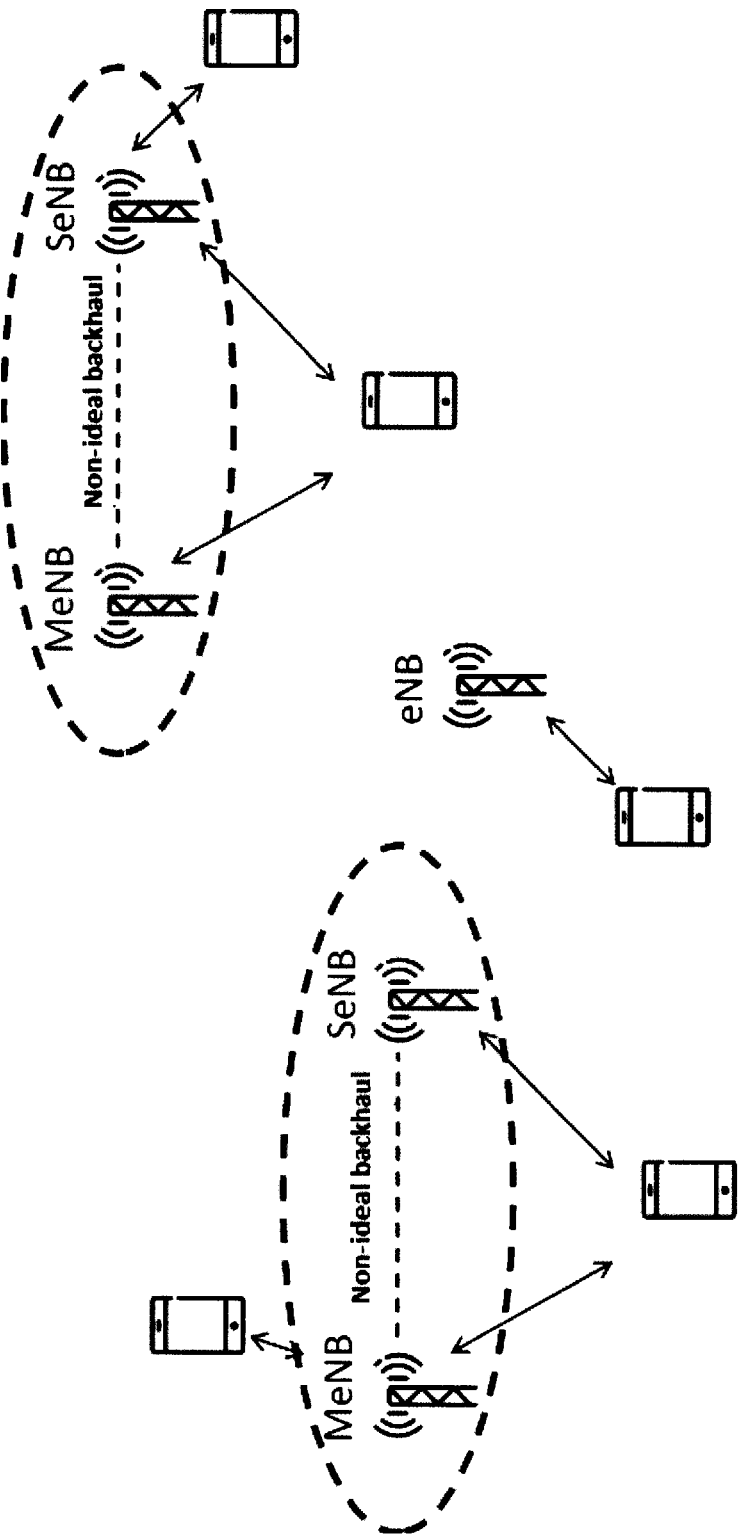
FIG. 1 shows a dual connectivity deployment scenario.

Dual Connectivity may generally refer to the operation or condition or mode of operation in which a given user equipment (UE) consumes radio resources provided by at least two different network points or nodes (e.g. Master eNB, MeNB, and Secondary eNB, SeNB).

A dual connectivity framework and corresponding methods and devices are being considered. In particular, there are described method for operating a UE (user equipment) and/or a network node of or for a cellular communication network and corresponding devices and arrangements.

Dual Connectivity may generally refer to the operation or condition or mode of operation in which a given UE consumes radio resources provided by at least two different network points or nodes (e.g. Master eNB, MeNB, and Secondary eNB, SeNB); the network points or nodes may be connected to each other via a backhaul, which may be a non-ideal backhaul. The UE may be in a RRC_CONNECTED state while in dual connectivity.

A UE in dual connectivity may maintain simultaneous connections to anchor and booster nodes, wherein the MeNB is interchangeably called anchor node or anchor and the SeNB is interchangeably called booster node or booster; there may be considered the use of more than one SeNB as a case of dual connectivity. As the name implies, the MeNB may be adapted to and/or control the (dual) connection, e.g. scheduling (at least for communication between the MeNB and the UE, and/or in particular handover of the SeNB.

Signaling in MeNB may be needed even in SeNB change. Both the anchor node and booster node may be adapted to terminate the control plane connection, in particular the control plane connection between itself and the UE, towards the UE and can thus be the controlling node/s of the UE. It may be considered that the anchor node is adapted for controlling and/or controls (and/or comprises a corresponding control module) the communication between the UE and the anchor node, e.g. in regards to scheduling and/or assigning resources and/or configuring the UE, e.g. for one or more cells or carriers providing a communication connection between UE and anchor node.

Alternatively or additionally it may be considered that a booster node is adapted for controlling and/or controls (and/or comprises a corresponding control module) the communication between the UE and the booster node, e.g. in regards to scheduling and/or assigning resources and/or configuring the UE, e.g. for one or more cells or carriers providing a communication connection between UE and the booster node. The UE may be adapted to read and/or read system information from the anchor node. Reading information from a node may comprise receiving a transmission from the node, wherein the transmission includes the information. In addition to the anchor, the UE may be connected to one or several booster nodes for added user plane support (user plane may refer to the connections of and/or visible to a user or user equipment). The MeNB and SeNB may be connected to each other via the Xn interface, which may be the same as the X2 interface between two eNBs in LTE/E-UTRAN.

More specifically dual connectivity (DC) may be a mode of operation of a UE in RRC_CONNECTED state, where the UE is configured with a Master Cell Group (MCG) and a Secondary Cell Group (SCG). Cell Group (CG) may refer to a group of (serving) cells associated with and/or provided by either a MeNB or a SeNB, respectively.

A cell group may generally comprise at least one cell. MCG and SCG may be defined as follows: A Master Cell Group (MCG) is a group of serving cells associated with the MeNB, comprising of a PCell and optionally one or more SCells. The Master Cell group may comprise a carrier aggregate. A Secondary Cell Group (SCG) is a group of serving cells associated with the SeNB comprising of pSCell (Primary SCell) and optionally one or more SCells.

A cell may be generally a communication cell, e.g. of a cellular or mobile communication network, provided by a node. A serving cell may be a cell on or via which a network node (the node providing or associated to the cell) transmits and/or may transmit data (which may be data other than broadcast data) to a user equipment, in particular control and/or user or payload data, and/or via or on which a user equipment transmits and/or may transmit data to the node; a serving cell may be a cell for or on which the user equipment is configured and/or to which it is synchronized and/or has performed an access procedure, e.g. a random access procedure, and/or in relation to which it is in a RRC_connected or RRC_idle state, e.g. in case the node and/or user equipment and/or network follow the LTE-standard.

A Master eNB or anchor node may be a node or an eNB which terminates at least S1-MME (which has a connection, in particular a connection without being relayed via another node or eNB, to a MME and/or via a S1-MME interface) and/or which controls handover for at least one booster node or Secondary eNB and/or which provides system information and/or allocation data to the UE it serves as anchor node.

A booster node or Secondary eNB may be a node or an eNB that is providing additional radio resources for the UE, but is not the Master eNB and/or which is controlled or controllable by a Master eNb or anchor node, in particular regarding handover. Generally, an anchor node may be a network node, which may be an eNB, in particular a master eNB. A booster node may be a network node, which may be a different node than the anchor node, in particular an eNB, which may be a Secondary eNB.

FIG. 1 illustrates a dual connectivity setup. In this example, only one SeNB is connected to a UE, however, more than one SeNB can serve the UE in general. As shown in FIG. 1, dual connectivity is a UE specific feature and a network node can support a dual connected UE and a legacy UE (a UE not in and/or not capable of a dual connectivity mode) at the same time.

Generally, the anchor and booster roles are defined from a UE point of view. This means that a node that acts as an anchor to one UE may act as booster to another UE. Similarly, though the UE may read system information from the anchor node, a node acting as a booster to one UE, may or may not distribute system information to another UE.

It is worth mentioning here that, the terms anchor node and MeNB are interchangeable. Similarly, the terms SeNB and booster node are used interchangeably.

An anchor node or MeNB may:
Provide system information
Terminate control plane
Can terminate user plane
A booster node or SeNB may and/or be defined as a node that:
Can terminate control plane
Terminate (only) user plane
Generally, terminating a plane by a node/eNB may refer to a node representing an end point and/or being connected to an end point of the plane, e.g. a user plane or control plane (another end point may be represented by the UE, e.g. as the target or recipient of control/allocation data from the control plane).

In one application, dual connectivity allows a UE to be connected to (at least) two nodes to receive data from both nodes to increase its data rate. This user plane aggregation achieves similar benefits as carrier aggregation (and may be in addition to carrier aggregation). For dual connectivity, network nodes that are not connected by low-latency backhaul/network connection may be used. Due to this lack of low-latency backhaul, the scheduling and HARQ-ACK feedback from the UE to each of the nodes will need to be performed separately.

In dual connectivity the nodes (anchor and/or one or more booster nodes) may be adapted to individually and/or separately control the serving cells connected or associated to a user equipment and/or the communication and/or resources associated to the serving cells, e.g. by providing corresponding allocation or control data to the user equipment. In particular, a node may be adapted to control the serving cell/s it provides itself and/or via which it communicates and/or may communicate with a user equipment.

A UE adapted for dual connectivity may comprise two (or at least two, in particular at least one for each node used for dual connectivity) UL transmitter arrangements (e.g. corresponding transmitter circuitry and/or antenna circuitry, which may be operated and/or controlled, e.g. by control circuitry of the UE, independently of each other) for transmitting UL data, e.g. control data and/or user data, to the connected nodes, and/or may comprise two (or at least two, in particular at least one for each (serving) node used for dual connectivity) UL receiver arrangements (e.g. corresponding receiver circuitry and/or antenna circuitry, which may be operated and/or controlled, e.g. by control circuitry of the UE, independently of each other) to receive DL data, e.g. control data and/or user data, from the nodes it is connected to and/or which serve the UE. The serving cells of different nodes in a dual connectivity arrangement may have different carriers and/or spectra. A node may be considered to be serving the UE if it provides at least one serving cell to the UE.

In a typical scenario, the dual links with MeNB and SeNB belong to different carrier frequencies and even different frequency bands.

Synchronized or unsynchronized dual connectivity operation is discussed in the following. Since dual connectivity operation involves two non-co-located transmitters (i.e. MeNB and SeNB), one of the main issues related to UE receiver performance is the maximum receive timing difference ($\Delta t$) of the signals from MeNB and SeNB received at the UE receiver. This gives rise to two cases of dual connectivity (DC) operation with respect to the UE: synchronized DC operation and unsynchronized DC operation.

The synchronized operation herein means that the UE can perform DC operation provided the received time difference ($\Delta t$) between the signals received at the UE from the CCs belonging to the MCG and SCG are within a certain threshold (which may be a synchronization range or threshold), e.g. ±30 µs. The received time difference may be known to at least the anchor node and/or the booster node/s and/or the UE, e.g. from measurements, the result of which may be transmitted and/or exchanged between the node/s and the UE. As a particular example, the synchronized operation herein may mean that the received time difference ($\Delta t$) between the signals received at the UE from and/or as measured in regard to subframe boundaries (e.g. the end or a beginning of a subframe) of subframes of the serving cell/s of the anchor node and subframes of the serving cell/s of the booster node/s, e.g. regarding CCs (component carriers; carriers of a carrier aggregate (CA) provided by a node; a single carrier may be considered to be subcase of CA) belonging to the MCG and SCG are within a certain threshold e.g. ±30 µs.

The unsynchronized operation herein may mean that the UE can perform DC operation regardless of the received time difference ($\Delta t$) between the signals received at the UE from the CCs belonging to the MCG and SCG i.e. for any value of $\Delta t$ and/or outside or above a synchronization range or threshold. As a particular example the unsynchronized operation herein means that the received time difference ($\Delta t$) between the signals received at the UE from the subframe boundaries (e.g., as defined above), e.g. of the CCs belonging to the MCG and SCG, can have any value e.g. more than ±30 µs, any value up to ±0.5 ms etc.

A maximum receive timing difference ($\Delta t$) at the UE may comprise, or consist of, the following components:

(1) Relative propagation delay, which may be expressed as the difference of propagation delay between MeNB to UE and SeNB to UE, (2) Tx timing difference, e.g. due to synchronization levels between antenna connectors of MeNB and SeNB, and (3) Delay due to multipath propagation of radio signals from each of the eNBs.

A UE may generally be adapted for dual connectivity, e.g. for synchronized and/or unsynchronized dual connectivity, in one or more than one frequency bands and/or band combinations and/or carriers or carrier combinations. The UE may be configurable to perform corresponding dual connectivity. The UE may be adapted to signal and/or signals capability information, e.g. its dual connectivity capability, to the network, e.g. one or more network nodes, e.g. anchor and/or booster.

Capability information, which may also be called DC capability information, and/or dual connectivity capability may generally indicate whether the UE is capable of synchronized and/or unsynchronized dual connectivity operation. The UE may comprise a corresponding capability signaling module.

The capability information may be associated with and/or indicate a (frequency) band or band combination/s and/or carrier or carrier combination/s supported by the UE for dual connectivity operation, in particular each of those supported, e.g. the UE may be adapted to provide and/or signal capability information indicating it supports synchronized and unsynchronized DC operations for frequency band combinations: band 1+ band 3 and band 7+ band 8 respectively.

Based on this received UE capability information, the network node can determine whether the UE should be configured in synchronized or unsynchronized DC operation for a particular band or band combination and/or carrier or carrier combination. A band combination or carrier combination may refer to one or more carrier aggregates. A node, in particular an anchor node or MeNB, may be adapted to perform such determination and/or the corresponding configuration of the UE, e.g. by transmitting corresponding control data or allocation data to the UE.

Relative propagation delay between MeNB and SeNB is discussed in the following. A maximum of 30.26 µs may be designed for worst case non-co-located CA coverage case as a synchronization range or threshold. 30.26 µs corresponds to signal propagation distance of just over 9 km. In dense urban scenarios, maximum misalignment due to propagation delay that can be seen is around 10 µs. This is linearly related to relative physical distance between the nodes. Accordingly, there is provided a large amount of timing misalignment margin which may not be required due to distance between nodes, which means that there is a possibility to actually relax the requirement even higher than certain transmit timing misalignment (i.e. synchronization accuracy between MeNB and SeNB), e.g. 3 µs. 3 µs is chosen here due to the fact that co-channel synchronization accuracy requirement for TDD systems is 3 µs (which means that the tightest requirement that can be achieved is 3 µs).

A received time difference at UE between signals from MeNB and SeNB is discussed in the following. The synchronized case essentially means that MeNB and SeNB transmit timing need to be synchronized up to certain level of time accuracy, while the unsynchronized case provides a random value for synchronization accuracy (i.e. anything up to 1 ms), which may be higher than the accuracy (represented by a maximum delay as mentioned above) required in the synchronized case.

Figure 2:
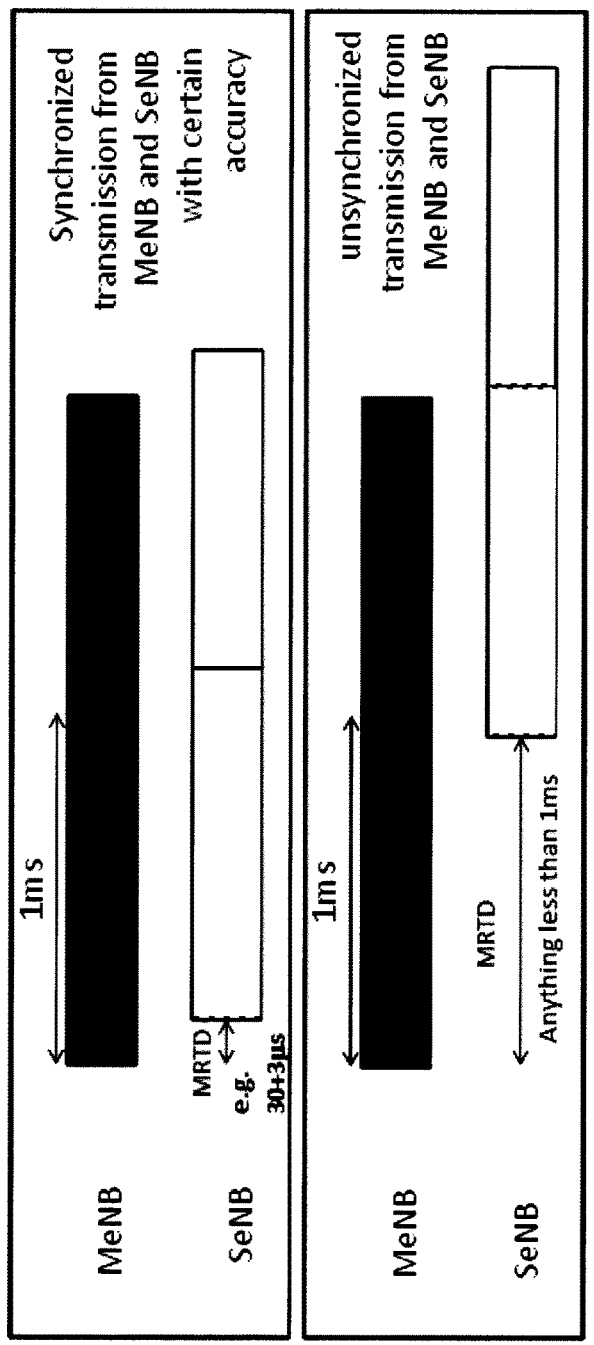
FIG. 2 shows examples of a maximum receive timing difference at the UE.

It is worth noting here that the receive timing difference, referred to herein, is the received timing misalignment between two received signals from subframe boundaries of MeNB and SeNB at the UE. In other words, this is not the transmit timing mismatch levels between the MeNB and SeNB. FIG. 2 shows examples of a maximum receive timing difference at the UE.

There may be considered a UE having dual Tx/Rx (two transmitters and receivers, which a usable independently). Anchor node and booster node/s may have non-ideal backhaul, such that the MeNB/anchor and SeNB/booster may be assumed to not be synchronized to each other. A corresponding arrangement is considered. Dual Tx/Rx means that we will potentially have separate PAs for separate links, thus no strict synchronization requirement is needed. This is the Case (2) in FIG. 2-2. If the requirements for the unsynchronized case are well defined, then the UE can also operate and meet requirements for synchronized case. However, case (1) in FIG. 2.2 suggests defining certain synchronization accuracy between MeNB and SeNB applicable only for Case (2).

Delay due to multipath radio environments discussed in the following. The received time difference of radio signals from MeNB/anchor and SeNB/booster may also incorporate additional delay introduced by the multi-paths on individual links due to the characteristics of the radio environment. For example, in typical urban environments, the delay spread of multiple paths received at the UE may typically be in the order of 1-3 µs. However, in wide areas like in sub urban or rural deployment scenario, the channel delay spread due to multipath effect of the signals observed at the UE is relatively smaller e.g. less than 1 µs.

Dual connectivity as UE specific operation is discussed in the following. In general, network-wide synchronization is not needed for dual connectivity since dual connectivity is a UE specific operation. A specific or certain UE is connected to two nodes/eNBs (e.g. anchor and booster) in dual connectivity operation, thus the synchronization requirement is only needed between only two eNBs when they serve the UE for dual connectivity operation, i.e. the involved MeNB and SeNB.

It should also be noted that the same MeNB and SeNB may also be serving UEs not in dual connectivity. To ensure that the UE operating in dual connectivity operation is able to receive signals from MeNB and SeNB (which may be unsynchronized and/or have an unknown and/or large timing difference) within the maximum allowed received time difference the UE may be adapted or configured or operated to meet certain requirements (e.g., measurement requirements, measurement accuracy requirements, RLM requirements, UE performance requirements, UE demodulation and CSI requirements, etc.), which may comprise:

1. The received time difference at the UE from the MeNB/anchor and the SeNB/booster is within the allowed limit and/or
2. The maximum transmit time difference between the MeNB/anchor and the SeNB/booster is within certain time limit.

Timing advance is discussed in the following. In order to preserve the orthogonality in the uplink (UL), the UL transmissions from multiple UEs in LTE need to be time aligned at the node or eNodeB receiver. This means the transmit timing of the UEs, which are under the control of the same node (e.g. serving or controlling node) or eNodeB, should be adjusted to ensure that their received signals arrive at the node or eNodeB receiver at the same time or, more specifically, that their received signals should arrive well within the cyclic prefix (CP). A normal CP length is about 4.7 µs (in LTE). This ensures that the node or eNodeB receiver is able to use the same resources (i.e. same DFT or FFT resource) to receive and process the signals from multiple UEs. The node or eNodeB may be adapted to configure and/or control the UE/s accordingly.

The UL timing advance (TA) is maintained by the eNodeB through timing advance commands (aka timing alignment commands) sent to the UE based on measurements on UL transmissions from that UE. For example, the eNodeB measures two way propagation delay or round trip time for each UE to determine the value of the TA required for that UE.

For a timing advance command received on subframe n, the corresponding adjustment of the uplink transmission timing shall by applied by the UE from the beginning of subframe n+6.

The timing advance command indicates the change of the uplink timing relative to the current uplink timing of the UE transmission as multiples of 16 Ts, where Ts=32.5 ns and is called basic time unit in LTE.

In case of random access response, an 11-bit timing advance command, $T_A$, for a timing advance group (TAG) indicates $N_{TA}$ values by index values of $T_A$=0, 1, 2, . . . , 1282, where an amount of the time alignment for the TAG is given by $N_{TA}=T_A \times 16$. In other cases, a 6-bit timing advance command, $T_A$, for a TAG indicates adjustment of the current $N_{TA}$ value, $N_{TA,old}$, to the new $N_{TA}$ value, $N_{TA,new}$, by index values of $T_A$=0, 1, 2, . . . , 63, where $N_{TA,new}=N_{TA,old}+(T_A-31) \times 16$. Here, adjustment of $N_{TA}$ value by a positive or a negative amount indicates advancing or delaying the uplink transmission timing for the TAG by a given amount respectively.

Timing advance updates are signalled by the eNB to the UE in MAC PDUs.

The initiation of dual connectivity service or operation for a UE may depend on availability of UE connections to more than one network nodes or eNBs. As long as a maximum receive timing difference (MRTD) requirement is satisfied, the dual connectivity operation can be supported for this UE. The MRTD that can be supported by the UE depends on whether the UE is capable of synchronized or unsynchronized DC operation. However, there is no mechanism for the network node to know whether the UE is able to support a certain MRTD in real deployment scenario. Thus, initiation of dual connectivity operation may become unreliable in case MRTD exceeds the level that can be supported by the UE. The real MRTD also may vary over time due to UE mobility. Since a network node does not know the current MRTD at the UE, the network node cannot take any appropriate action (e.g. by configuring the UE) to avoid or minimize the performance degradation of the UE.

There are outlined a number of ways to determine whether a synchronized or unsynchronized mode or operation of dual connectivity is supported for any specific UE.

A network node may generally be adapted for and/or to control dual connectivity operation, e.g. synchronized and/or unsynchronized. It may comprise a corresponding connectivity module.

A UE may generally be adapted for and/or to control dual connectivity operation, e.g. synchronized and/or unsynchronized. It may comprise a corresponding connectivity module.

For example, there are described methods in and/or for operating a UE and/or a network node (e.g., a radio network node such as eNodeB, a core network node, etc.).

A method in and/or operating a network node may comprise any one or any combination of the actions:
- (optionally) determining or obtaining capability information regarding a UE, e.g. information regarding the dual connectivity capability of the UE, e.g. by receiving corresponding signaling from the UE and/or from the network or another network node;
- (optionally) configuring the UE in unsynchronized DC mode if the UE supports unsynchronized DC mode in at least one band or band combination (this may be an initial configuring);
  - observing or estimating a length of a gap used by the UE (which may be or operate in a dual connectivity operation or mode for the observed or estimated gap) for measurement (Mg) and/or length of serving cell interruption (Tint) caused by the UE on at least one serving cell; wherein the serving cell may be a serving cell provided and/or controlled by the network node;
  - Comparing the Mg and/or Tint with respective thresholds; the thresholds may be pre-determined, e.g. stored in a memory of the network node and/or accessible to control circuitry of the network node
  - Determining whether the UE actually operates in unsynchronized or synchronized DC mode based on the said comparison;
- (optionally) Configuring or operating the UE with the determined DC mode.

A network node, e.g. a network node of or for a cellular communication network, may be adapted for:
- (optionally) determining or obtaining capability information regarding a UE, e.g. information regarding the dual connectivity capability of the UE, e.g. by receiving corresponding signaling from the UE and/or from the network or another network node; the node may comprise a corresponding capability determining module for this determining or obtaining;
- (optionally) configuring the UE in unsynchronized DC mode if the UE supports unsynchronized DC mode in at least one band or band combination or carrier or carrier combination (this may be an initial configuring); the node may comprise a corresponding configuring module for this configuring;
  - observing or estimating a length of a gap used by the UE (which may be or operate in a dual connectivity operation or mode for the observed or estimated gap) for measurement (Mg) and/or length of serving cell interruption (Tint) caused by the UE on at least one serving cell; wherein the serving cell may be a serving cell provided and/or controlled by the network node; the node may comprise a corresponding length observing module for this observing or estimating;
  - Comparing the Mg and/or Tint with respective thresholds; the thresholds may be pre-determined, e.g. stored in a memory of the network node and/or accessible to control circuitry of the network node the node may comprise a corresponding comparing module for this comparing;
  - Determining whether the UE actually operates in unsynchronized or synchronized DC mode based on the said comparison; the node may comprise a corresponding mode determining module for this determining;
- (optionally) Configuring or operating the UE with the determined DC mode; the node may comprise a corresponding mode configuring module for this configuring or operating and/or the configuring module may be adapted correspondingly for this configuring or operating.

A method in a UE may comprise any one or any combination of:
- Estimating a maximum received time difference (MRTD) of signals from subframe boundaries of MCG and SCG at the UE;
- Comparing the MRTD with a threshold (e.g. a synchronization range or threshold); the threshold may be pre-determined, e.g. received from a network or network node, e.g. an anchoring or serving node, and/or stored in a memory of the UE and/or accessible to control circuitry of the UE;
- Determining whether the UE currently operates in unsynchronized or synchronized DC mode based on the said comparison of MRTD;
- (optionally) signaling to a network or network node whether the UE currently operates in unsynchronized or synchronized DC mode; wherein signaling may comprise transmitting to a network node a signal pattern that indicates whether the UE currently operates in unsynchronized or synchronized DC mode, wherein the signal pattern may comprise of a first signal pattern if the UE operates in synchronized DC or a second signal pattern if the UE operates in unsynchronized DC and wherein the first signal pattern and the second signal pattern are different.

A UE, in particular a UE of or for a cellular communication network, may be adapted for:
- Estimating a maximum received time difference (MRTD) of signals from subframe boundaries of MCG and SCG at the UE; the UE may comprise a corresponding estimating module for this estimating;
- Comparing the MRTD with a threshold (e.g. a synchronization range or threshold); the threshold may be pre-determined, e.g. received from a network or network node, e.g. an anchoring or serving node, and/or stored in a memory of the UE and/or accessible to control circuitry of the UE; the UE may comprise a corresponding comparing module for this estimating;
- Determining whether the UE currently operates in unsynchronized or synchronized DC mode based on the said comparison of MRTD; the UE may comprise a corresponding mode determining module for this estimating;
- (optionally) signaling to a network or network node whether the UE currently operates in unsynchronized or synchronized DC mode; wherein signaling may comprise transmitting to a network node a signal pattern that indicates whether the UE currently operates in unsynchronized or synchronized DC mode, wherein the signal pattern may comprise of a first signal pattern if the UE operates in synchronized DC or a second signal pattern if the UE operates in unsynchronized DC and wherein the first signal pattern and the second signal pattern are different; the UE may comprise a corresponding signaling module for this signaling.

In addition to or independent from the above, a method in or for operating a network node may comprise any one or any combination of:
- Receiving, from a UE, signaling indicating whether the UE currently operates in unsynchronized or synchronized DC mode, e.g. receiving information about or as a signal pattern that indicates whether the UE currently operates in unsynchronized or synchronized DC mode, wherein the signal pattern may comprise of a first signal pattern if the UE operates in synchronized DC or a second signal pattern if the UE operates in unsynchronized DC and wherein the first signal pattern and the second signal pattern are different.

(optionally) Configuring or operating the UE in unsynchronized or synchronized DC mode based on the received information and/or the received the signal pattern from the UE.

In addition to or independent from the above, a network node may be adapted for:

Receiving from a UE signaling indicating whether the UE currently operates in unsynchronized or synchronized DC mode, e.g. receiving information about or as a signal pattern that indicates whether the UE currently operates in unsynchronized or synchronized DC mode, wherein the signal pattern may comprise of a first signal pattern if the UE operates in synchronized DC or a second signal pattern if the UE operates in unsynchronized DC and wherein the first signal pattern and the signal pattern are different; the node may comprise a corresponding signal receiving module for this signaling;

(optionally) Configuring or operating the UE in unsynchronized or synchronized DC mode based on the received information and/or the received the signal pattern from the UE; the node may comprise a corresponding mode configuring module for this configuring or operating and/or the above-mentioned mode configuring module may be adapted accordingly.

Accordingly, the network node may determine whether the UE operates in synchronized or unsynchronized DC mode. The network node may be adapted to apply or adapt the procedures which correspond to the current DC mode of the operation of the UE i.e. procedures such as scheduling for synchronized or unsynchronized DC mode.

The network node may thus use the radio resources more efficiently.

The network node may be adapted to be aware of the UE behavior with respect to UE operation in synchronized or unsynchronized DC mode.

In some examples, the non-limiting term UE is used. The UE herein can be any type of wireless device capable of communicating with network node or another UE over radio signals. The UE may also be radio communication device, target device, device to device (D2D) UE, machine type UE or UE capable of machine to machine communication (M2M), a sensor equipped with UE, iPAD, Tablet, mobile terminals, smart phone, laptop embedded equipped (LEE), laptop mounted equipment (LME), USB dongles, Customer Premises Equipment (CPE) etc.

Also in some embodiments generic terminology, "radio network node" or simply "network node (NW node)", is used. It can be any kind of network node which may comprise of base station, radio base station, base station transceiver station, base station controller, network controller, evolved Node B (eNB), Node B, relay node, access point, radio access point, Remote Radio Unit (RRU), Remote Radio Head (RRH) etc.

In some embodiments first node and second node are used, where first node can be network node and second node can be UE. The first node and second node may also be interchangeably called as first radio node and second radio node respectively. In some embodiments cell change of the second node (e.g. UE) is done by the first node or by the second node itself. In some embodiment only the term node may be used which can be first or second node e.g. in case both first and second node can perform the same task.

In some embodiment the term determining is used and it may also be or comprise obtaining, receiving, calculating, estimating, detecting, identifying etc, information or parameter etc.

The embodiments are described by considering LTE. However the embodiments are applicable to any RAT or multi-RAT systems, where the UE receives and/or transmit signals (e.g. data) e.g. LTE FDD/TDD, WCDMA/HSPA, GSM/GERAN, Wi Fi, WLAN, CDMA2000 etc.

The following embodiments may be applied to any of the dual connectivity cases. In another words, regardless of number of CCs in DL or UL, the embodiments directly apply.

There are in particular described:

methods in or for operating a node (e.g. network node or anchor node or booster node) of determining dual connectivity mode for the UE;

methods in or for operating a node of acting upon detection of dual connectivity mode These methods are described in detail below.

Methods in a network node to autonomously determine dual connectivity mode of UE are described in the following.

The dual connectivity mode generally can either be synchronized DC mode or in unsynchronized DC mode. That means a DC capable UE (which may be adapted accordingly) can be configured by the network node to operate in either synchronized DC mode or in unsynchronized DC mode. The dual connectivity mode may also be interchangeably called as DC synchronization mode, DC mode in terms of MRTD etc.

The network node may be adapted to apply and/or apply different radio procedures for the UE in different DC modes. For example the network node (e.g. SeNB) may not schedule the UE in a subframe before or after a measurement gap when UE operates in unsynchronized mode. But in synchronized mode, the UE may be scheduled in any subframe other than those in measurement gaps. However, the network node may not necessarily inform the UE in which of the two modes the UE is configured for performing DC operation. The network node may comprise a corresponding applying or scheduling module, which may be implemented in a configuring module.

The network node may determine a suitable DC mode for a particular UE and based on that configures the UE in that DC mode. The network node based on one or more of the following principles can determine the DC mode in which a UE needs to be configured. After determination the network node may configure the UE in the determined DC mode and configures or operates (e.g. schedules) the UE based on the determined or configured DC mode.

Determination of a DC mode based on predefined rule is described in the following. It may be considered that the node is adapted, when a UE is capable of supporting both synchronized and unsynchronized mode of dual connectivity and/or the node obtains corresponding information, to (initially) configure the UE with or for unsynchronized dual connectivity. In this way, the dependability on network synchronization status or resulting maximum receive timing window can be removed. Thus, the network may allocate unsynchronized dual connectivity configuration for this UE in particular initially or in the beginning, e.g. at the time of setting up of the DC operation for that UE.

The UE may not be capable of both synchronized and unsynchronized DC modes in all band or band combinations supported by the UE for DC. Similarly the network node (e.g. MeNB) may not support synchronized and unsynchronized DC modes in all band or band combinations available at the network node for DC operations.

The network node (e.g. an anchor node or MeNB) may perform, and/or be adapted to perform, the following steps, e.g. for a UE that is intended to be configured in DC operation:

Obtaining capability information, e.g. a first set of information about the UE capability information about bands or bands combinations and/or carrier or carrier combinations, in which the UE supports synchronized and unsynchronized dual connectivity operations. This information can be obtained based on historical data or by retrieving the stored capability information from the network node or from receiving it from the UE and/or from another network node, which may signal it; the network node may comprise a corresponding capability obtaining module for this obtaining;

Obtaining a second set of information about bands or bands combinations and/or carrier or carrier combinations in which the network node supports at least unsynchronized dual connectivity operation. The information may further comprise of bands or bands combinations and/or carrier or carrier combinations in which another, e.g. neighboring, network node/s (e.g. SeNB/s) supports at least unsynchronized dual connectivity operation. This information can be obtained based on historical data and/or by retrieving the stored capability information from the network node; alternatively or additionally, corresponding information (in particular regarding another or neighboring node) may be received from another node or the network. For example it may be expressed in terms of a mapping table that maps bands or bands combinations to the at least unsynchronized dual connectivity operation; the node may comprise a corresponding obtaining module for this obtaining;

Determining a third set of information based on the obtained first and the second sets of information, wherein third set of information comprises and/or indicates bands or bands combinations and/or carrier or carrier combinations in or for which both the UE and the network node can support at least unsynchronized dual connectivity operation. The third set of information may further comprise or indicate bands or bands combinations and/or carrier or carrier combinations in or for which the UE's neighboring network node/s (e.g. SeNB/s) also support/s at least unsynchronized dual connectivity operation; the network node may comprise an information determining module for this determining;

configuring the UE with unsynchronized dual connectivity operation for or in at least one of the band or band combinations and/or carrier or carrier combinations, based on the determined third set of information and/or for or in at least one of the band or band combinations and/or carrier or carrier combinations for which both the UE and the network node support at least unsynchronized dual connectivity; the network node may comprise a corresponding configuring module for this configuring (optionally) configuring or reconfiguring the UE with unsynchronized DC in another band or band combination based on the third set of information; the node may comprise a corresponding reconfiguring module for this configuring or reconfiguring or the configuring module may be adapted accordingly.

(optionally) configuring or reconfiguring the UE for or with synchronized DC in a, in particular another or different, band or band combination and/or carrier or carrier combination, e.g. based on the first set of information in case the network node is able to obtain or determine the MRTD at the UE during the time when the UE is configured with unsynchronized dual connectivity operation (e.g. in an initial phase after initial configuring). Obtaining or determining the MRTD or expected MRTD may be based on the values of the timing advance commands sent to the UE by anchor/MeNB and/or booster/SeNB, e.g. as described herein; the node be adapted for such obtaining or determining and/or comprise a corresponding MRTD determining module.

Generally, configuring the UE for or with a DC mode may comprise configuring it to operate in this mode.

Determination of DC mode based on timing advance known at network nodes is described in the following.

The network node and/or a MRTD determining module may be adapted for determining and/or may determine the MRTD of signals from an anchor/MeNB and/or one or more booster/SeNBs at the UE by using the timing advance commands sent to the UE in DC operation by the respective anchor/MeNB and/or booster/SeNBs. In some cases, the UE may initially be configured either in synchronized DC mode or unsynchronized DC mode, e.g. by the network or a network node, e.g. an anchor node. After determining the MRTD at the UE, the network node (e.g. an anchor node), based on the MRTD, may change the DC mode of the UE, e.g. by configuring it accordingly. For example, the network node and/or (mode) configuring module may be adapted to configure and/or configure, if the determined MRTD is with within a certain range and/or threshold (e.g. ±30 µs), the UE for or with synchronized DC mode; otherwise the UE may be configured for or with unsynchronized DC mode.

Method of determination of MRTD based on TA values are illustrated below with several examples: The UE in DC may be configured with multiple TA groups (MTAGs), which comprise of pTAG and sTAG. The MeNB and SeNB configure the UE with TA1 and TA2 for uplink transmissions in serving cells in MCG and in SCG respectively. The TA1 and TA2 belong to pTAG and sTAG respectively. The values of TA1 and TA2 are updated and resent to the UE when propagation delay between UE and the respective network node (e.g. MeNB or SeNB) may change over time.

The MeNB and SeNB therefore contain and retain information about TA1 and TA2 respectively. Either MeNB or SeNB or both of these nodes can combine this information (i.e. TA1 and TA2) to determine the final maximum receive timing difference by using a suitable function as further elaborated below.

As an example, the MeNB and SeNB obtain the information related to the required timing advance, TA1 and TA2 separately for each node (anchor and booster/s).

This information can be combined together at the anchor or MeNB by either of the following mechanisms:

1. At least the anchor receives the information from the booster/s, e.g. the MeNB and SeNB may share the timing advance information between the nodes, e.g. via the X2 interface 2. The timing advance information can be shared between nodes in a predefined form, such as if there is no information from SeNB to MeNB, then the MeNB assumes required TA for SeNB to be below certain pre-defined value, e.g. X=3 µs. The pre-defined value can correspond to the maximum range of a cell e.g. 3 km. Generally, the anchor may be adapted to determine a required TA value for a booster to be at or below a pre-determined threshold if the booster does not transmit a TA value. Alternatively or additionally, a booster may be adapted to not transmit a TA value to the anchor if it is below or at a pre-defined threshold. The thresholds may be identical.

3. The anchor/MeNB may additionally or alternatively obtain or receive the TA for a booster/SeNB from another node in the network, e.g. O&M.

4. Alternatively or additionally, the anchor/MeNB may obtain or receive the TA for a booster/SeNB from the UE, which may be adapted to signal and/or transmit corresponding information to the anchor. In particular, the UE may signal the TA2 to the anchor/MeNB. The UE may signal TA2 periodically or whenever TA2 value changes by a certain threshold. The UE may also signal the difference between TA1 and TA2 (e.g. TA1-TA2 or TA2-TA1) periodically or whenever TA2 value changes by certain threshold or whenever the difference between TA1 and TA2 changes by certain threshold.

The anchor/MeNB may obtain the combined timing advance $TA_{DC}$, e.g., as follows:

$$TA_{DC}=|TA_1-TA_2| \quad (1)$$

The above expression leads to magnitude of difference between TA1 and TA2.

Other examples of $TA_{DC}$ are:
$TA_{DC}=f3(f1(TA_1),f2(TA_2))$, where f3 can be e.g. any of:
f3=max(f1,f2),
f3=w1*f1+w2*f2, f3=abs(w1*f1+w2*f2); f1 and f2, or fi in general, can be any of: fi=$TA_i$, fi=abs($TA_i$); w1 and w2, or wi in general, can be some positive, zero, or negative linear coefficients.

$TA_{DC}=f3(f1 (TA_1),f2(TA_2))$ if condition 1 holds, and $TA_{DC}=f4(f1 (TA_1),f2(TA_2))$ if condition 2 holds, for example: $TA_{DC}=TA1$ if $TA_1-TA_2>=$threshold, otherwise $TA_{DC}=|TA_1-TA_2|$.

The network node may further obtain the expected MRTD between signals received at the UE from MCG and SCG as a function of $TA_{Dc}$. Examples of functions are given below:

In a first example, the MRTD is determined as follows:

$$MRTD=TA_{DC}+\beta 1+\beta 2, \quad (2)$$

wherein β1 and β2 are the margins to account for the accuracies with which the UE transmits uplink signals towards MCG and SCG respectively. As an example β1 and β2 can be within ±30 Ts, where Ts is basic time unit; 1 Ts=32.5 ns.

In a second example, the MRTD is determined as follows:

$$MRTD=TA_{DC}+\alpha 1+\alpha 2, \quad (3)$$

wherein α1 and α2 are the margins to account for the accuracies with which the UE receives DL signals from MCG and SCG respectively. As an example α1 and α2 can be within ±15 Ts, where Ts is basic time unit; 1 Ts=32.5 ns.

In a third example, the MRTD is determined as follows:

$$MRTD=TA_{DC}+\alpha 1+\alpha 2+\beta 1+2. \quad (4)$$

In yet a fourth example, the MRTD is determined as follows:

$$MRTD=TA_{DC}+\alpha 1+\alpha 2+\beta 1+\beta 2+\delta 1+\delta 2, \quad (5)$$

wherein δ1 and δ2 are the margins to account for the mismatch in timing between UL and DL for signals transmitted between UE and MCG and UE and SCG respectively. In some special cases (e.g., when there is no corresponding mismatch or the mismatch is unknown), any of α1, α2, β1, β2, δ1, and δ2 can also be 0.

As stated earlier, if the determined MRTD based on any of the above expression is within a certain range (e.g. ±30 µs), then the network node or (mode) configuring module is adapted to configure or reconfigure and/or configures or reconfigures the UE in synchronized DC mode; otherwise the UE may be configured or reconfigured (or left) in unsynchronized DC mode.

Determination of DC mode based on UE behavior of interruption on serving cell(s) is described in the following.

Alternatively or additionally, the network node (e.g. an anchor node) may observe, and/or be adapted to observe and/or comprise an observing module for observing, the pattern of interruption (aka serving cell interruption) caused by the UE on one or more serving cells when performing a radio or cellular operations or tasks requiring the UE to reconfigure its radio receiver/s and/or transmitter/s and/or corresponding circuitry. Examples of such operations or tasks are:

1. the configuration of PSCell or an SCell by the UE. In this case, the UE may cause interruption of UL and DL signals in the PCell and on any activated SCell. The PSCell is served by the SeNB. The PCell in the MeNB can request the UE to configure the PSCell and/or one or more SCells in MeNB and/or in SeNB.

2. the activation or deactivation of a SCell by the UE may cause interruption of UL and DL signals in the PCell, PSCell and on any activated SCell. The MeNB or SeNB can activate or deactivate a configured SCell.

3. the UE may cause interruption of UL and DL signals in the PCell, PSCell and on any activated SCell while performing measurement on any deactivated SCell.

4. the UE may cause interruption of UL and DL signals in the serving cells belonging to CG in non-DRX while performing measurement on one or more of cells of any CC belong to CG configured in DRX. For example assume that the UE is configured with MCG consisting of PCell in non-DRX and with MCG of PSCell in DRX. When UE measures any cell on the carrier of the PSCell (including PSCell) then the UE may cause interruption on PCell.

When a PSCell or SCell is configured by a UE or a SCell is activated or deactivated by the UE, the UE need to introduce interruption on its PCell and activated SCell(s). This is because the UE RF chain (comprising e.g. receiving and/or transmitting and/or transceiver circuitry) need to be adapted to support the new carrier related to PSCell or SCell. In the same way, the UE has to reconfigure receiver and/or transmitter (or corresponding circuitry) when performing other tasks listed in the above examples. During the interruption time, the network node cannot receive UE signals and the UE cannot receive from and transmit towards the network node (in particular from or with the circuitry undergoing the adaptation).

In DC with 2 CCs there are PCell and PSCell. In this case, when the UE causes interruption on PCell due to PSCell configuration, then the length of interruption on PCell may depend on whether the UE actually operates in unsynchronized or synchronized DC mode. For example, the length of interruptions on PCell is 2 subframes and one subframe if the UE operates in unsynchronized and synchronized DC mode, respectively.

As an example, the network node typically determines or detects, and/or is adapted to determine or detect and/or may comprises a corresponding determining module for determining or detecting, the DC mode based on serving cell interruption during the initial configuration of PSCell or any SCell. Alternatively or additionally, the DC mode may be determined or detected (and/or the network node or determining module may be adapted accordingly) by applying this procedure at a later stage e.g. by reconfiguring the PSCell and/or SCell(s). Alternatively or additionally, the DC mode may be determined or detected (and/or the network node or determining module may be adapted accordingly) based on serving cell interruption during other radio operational tasks e.g. tasks 2-4 in the above example.

In order to observe the interruptions on PCell, the PCell may schedule (e.g., continuously or in certain subframes) the UE to receive DL data in every DL subframe. Scheduling by a cell, in particular by a PCell, may refer to the serving node providing and/or controlling the cell configuring the UE according to the schedule, e.g. by transmitting corresponding allocation data to the UE, which may provide resource scheduling to provide the scheduling within or for the corresponding cell.

In response the UE may send HARQ feedback (e.g. either ACK or NACK) in response to the reception of DL data in the scheduled DL subframe. The network node may then observe (or be adapted accordingly and/or comprise a corresponding observing module) the number of DL subframes for which the UE does not receive AC/NACK feedback sent by the UE in response to continuous DL reception. The number of subframes with missed ACK/NACK corresponds to the length of interruption.

The network node and/or the MRTD determining or obtaining module and/or an observing module may be adapted to determine, and/or determine and/or implicitly assume, that the MRTD at the UE is within a certain range or pre-determined threshold (e.g. within ±30 µs), if the length of interruptions on PCell is below or at a pre-determined length threshold, e.g. 1 ms. In this case, the network node and/or configuring module may be adapted to continue the UE to operate in synchronized DC mode, e.g. by configuring the UE accordingly and/or by leaving the UE configured as it is. Alternatively or additionally, the network node or MRTD determining or obtaining module or the observing module may be adapted to determine, and/or determine or implicitly assume, that the MRTD at the UE is outside a certain range or the pre-determined threshold (e.g. more than ±30 µs), if the length of interruptions on PCell is at and/or over a pre-determined upper length threshold, e.g. 2 ms. The certain range or pre-determined threshold (e.g. within ±30 µs) may refer to a synchronization range or threshold, within which synchronized DC may be performed.

Detection based on scheduling UE when UE is configured with gaps or UE creates autonomous gaps is described in the following. The UE behavior with respect to transmission and/or reception of signals before or after the measurement gaps may depend on whether the UE is in synchronized or unsynchronized DC mode.

The network (or network node or configuring module) may be adapted to configure, and/or may configure, the UE with the measurement gaps for enabling the UE to perform inter-frequency and/or inter-RAT measurements. The network (or network node or configuring module) may also configure the UE to acquire the system information (SI) of the target cell. This requires the UE to create autonomous gaps during which the UE acquires the SI of the target cell. For example the UE create 10 autonomous gaps each of 4 ms long over the measurement duration (T0) i.e. T0 over which the UE acquires the SI. The acquiring of SI may comprise acquiring the MIB and one or more SIBs (e.g. SIB1) of the target cell. The UE behavior with respect to transmission and/or reception of signals before or after each autonomous gap also depends on whether the UE is in synchronized or unsynchronized DC mode. This is further elaborated below:

In case of unsynchronized dual connectivity, due to subframe timing boundary mismatch between MCG and SCG (i.e. up to 1 slot), one more subframe is needed for gap in SCG compared to MCG. For example if the gap length in MCG is 6 ms then the gap length in SCG is 7 ms. This means that during the gap the UE does not transmit towards and/or receive signals from any of the serving cells. In this embodiment, the network node as an example can schedule the UE to transmit in SCG in a subframe before and also in a subframe after each gap. If the network node can receive UE transmitted signals in both subframes then the network node may assume that the UE is actually operating in synchronized DC mode. But if the network node cannot receive UE transmitted signals in at least one of these subframes then the network node may assume that the UE is actually operating in unsynchronized DC mode. The network node and/or a configuring module may be adapted accordingly.

In order to implicitly determine the MRTD at the UE or implicitly determine that whether the UE is in synchronized or unsynchronized DC mode, the network node and/or a configuring module may be adapted to configure, and/or may configure, the UE operating in DC with measurement gap and/or be adapted to configure, and/or configure, the UE to acquire the SI of a target cell. In yet another example the network node may be adapted for and/or perform:

in a first step may configure the UE operating in DC only with measurement gap to detect the UE behavior before and after the gap; the network node may comprise a corresponding configuring module; and in a second step may configure the UE operating in DC only to acquire the SI of a target cell to detect the UE behavior before and after the autonomous gap; the configuring module may be adapted accordingly and/or the network node may comprise a corresponding SI configuring module for this configuring;

The network node may be adapted to combine, and/or may comprise a combining module for combining, and/or may combine both results based on the first and second steps to more reliably determine whether the UE is actually operating in synchronized or unsynchronized DC mode. For example. if based on the procedure in the first and second steps the network determined that the UE is in synchronized and unsynchronized DC modes respectively, then the network node may assume that the UE is in synchronized DC mode.

A method in a network node to determine DC mode based on UE signal transmission pattern is described in the following.

In this example, the UE may be adapted to signal, and/or comprise a corresponding signaling module, and/or signal whether it currently is in synchronized or unsynchronized DC mode, e.g. by transmitting a certain pattern of signals in the uplink to the network node to indicate whether the UE is currently operating in synchronized or unsynchronized DC mode.

Alternatively or additionally, the signal pattern may implicitly or explicitly indicate whether the MRTD at the UE is within a certain range (e.g. within ±30 µs) or is outside a certain range.

The signal pattern may enable the network node to determine whether the UE is currently operating in synchronized or unsynchronized DC mode.

The network node may be adapted to receive, and/or receives, the signal pattern from the UE; the network node may comprise a corresponding receiving module for this receiving.

It may be considered that the network node may be adapted to determine, and/or determines, whether the UE is operating in synchronized or unsynchronized DC mode bases on the signal pattern; the network node may comprise a corresponding determining module for this determining.

For example, two different signal patterns may be pre-defined: a first signal pattern and a second signal pattern; as an example:
- The first signal pattern indicates that the UE is currently in synchronized DC mode and/or MRTD at the UE is within a certain range (e.g. within ±30 μs), which may be a synchronization range or threshold;
- The second signal pattern indicates that the UE is currently in unsynchronized DC mode and/or MRTD at the UE is outside a certain range (e.g. within ±30 μs), which may be a synchronization range or threshold.

In one example the UE may initiate the transmission of the patterns autonomously and continuously i.e. the actual pattern depends on its current DC mode.

In another example the UE may initiate the transmission of the patterns whenever a certain condition is met e.g. whenever the DC mode changes, when MRTD changes with respect a certain threshold or range.

In yet another example the UE may initiate the transmission of the patterns whenever configured by the network node or whenever an explicit request is received from the network node.

In other examples, a signal pattern may comprise any one or more of:
- A specific type of a signal (e.g., SRS, CSI)
- In one embodiment, the signal can be scheduled adaptively in a specific way to facilitate the determining of the DC mode (e.g., in certain resources and/or with certain periodicity)
  - a time-domain pattern and/or frequency domain (e.g., certain subbands, certain RBs, certain resource elements, etc.) pattern
  - a time shift for all UL transmissions, determined based on RTD between MeNB and SeNB
- signal contents (e.g., pre-defined such as CQI 0) or signal sequence transmission signal bandwidth Further examples of the first and second signal patterns may comprise:
- The first signal pattern comprises of sending a certain value of channel state information (CSI) in one or more subframes with a first set of subframes.

Examples of the first set of subframes containing the first signal pattern are:
- only even subframe numbers e.g. subframes #0, 2, 4, 6 and 8.
- Subframe X (any one of the subframes within a frame).
- Pre-defined or configured set of subframes P e.g. subframes #0, #3 and #8.

The second signal pattern may comprise or be based on sending a certain value of channel state information (CSI) in one or more subframes with a second set (non-overlapping with the first set) of subframes. Examples of the second set of subframes containing the second signal pattern are
- only odd subframe numbers e.g. subframes #1, 3, 5, 7 and 9.
- Subframe X+N (N=1, 2, . . . ),
- Subframe Y different from subframe X.
- Pre-defined or configured set of subframes Q e.g. subframes #1, #4 and #9.

An example of CSI (channel state information) is CQI (channel quality information/indication). Example of the certain value of CQI is CQI with particular CQI index. As an example it can be CQI with CQI index 0 (aka out of range CQI). In another example the particular CQI index can be CQI with the largest CQI index. The UE may be adapted to signal or send, and/or comprise a corresponding signaling module, and/or signal or send signal pattern containing CSI corresponding to any serving cell e.g. PCell, PSCell or any SCell of the MCG and SCG.

The network node may be adapted to configure, and/or comprise a corresponding configuring module, and/or configure the UE to signal the pattern of CSI corresponding to a particular serving cell e.g. PCell or PSCell. It may also be pre-defined that the UE (which may be adapted or configured accordingly) may signal the pattern of CSI corresponding to a particular serving cell e.g. PSCell.

The UE may signal the signal pattern to the anchor/MeNB and/or the booster/SeNB. By default, or based on pre-defined rule, the UE may always signal the signal pattern to the MeNB. The network node (e.g. MeNB) receiving the signal pattern may also forward or transmit the received signal pattern to another network node, e.g. anchor/MeNB or booster/SeNB signals it to neighboring eNB over X2, MeNB signals it to SeNB over X2. The node may be adapted accordingly and/or comprise a corresponding transmitting module.

Methods in a network node and UE for determining the DC mode based on timing measurements performed for the purpose of DC configuration are described in the following.

According to this part of the disclosure, a node (UE or network node) may perform, and/or be adapted to perform and/or comprise a measurement module for performing, one or more positioning timing measurements (e.g., RSTD, TOA, UE Rx-Tx, eNodeB Rx-Tx, UL RTOA) regarding or for anchor/MeNB and/or booster/SeNB, and/or uses and/or is adapted to use a result of the measurement(s) (e.g., the measurements or the DC mode or the RTD determined based on the measurements) for obtaining (e.g., determining or receiving) the DC mode for the UE; the node may comprise a corresponding mode obtaining or determining module. The obtained DC mode may be used then by the node, e.g. network node, e.g. for configuring the DC mode in the UE and operating the UE respectively.

Example 1: performing, by the UE, comprises (autonomously or upon network request or implicit or explicit indication the need to determining the DC mode) performing timing measurement(s) for the purpose of determining the DC mode and performing one of:
- reporting the measurement(s) to a network node for determining the DC mode,
- determining the RTD and/or DC mode and sends the result of determining to the network node. The UE or measurement module may be adapted accordingly.

Example 2: configuring, by a network node, the UE with or for timing measurement(s), and receiving, by the network node, a result of the measurements, and obtaining, by the network node, the DC mode of the UE, e.g. based on the received result. The network node may be adapted accordingly and/or comprise a corresponding configuring module and a corresponding receiving module and a corresponding obtaining module.

Example 3: configuring, by the network node, the UE with or for UL transmissions to determine the DC mode of the UE, performing the measurement(s), and determining or obtaining the DC mode of the UE based on the measurement(s) and/or result of the measurement(s). The network node may be adapted accordingly and/or comprise a corresponding configuring module and a corresponding measuring module and a corresponding determining or obtaining module.

In another embodiment, a node (UE or network node) may be adapted to perform, and/or comprise a measuring module for performing, and/or may perform timing measurement(s) for an anchor/MeNB and two or more candidate booster/SeNBs and be adapted to determine or select, and/or comprise a determining or selecting module for determining or selecting, and/or may determine or select, based on a result of the measurement(s) (e.g., the measurements or the determined DC mode or the RTD determined based on measurements or the SeNB preference based at least on the measurements), a booster/SeNB for the UE and/or for dual connectivity operation of the UE. As a result, the selected SeNB may be configured for the UE, e.g., replacing the previous SeNB, configuring the SeNB if no SeNB has been yet configured, or adding to the list of SeNB for the UE (if multiple SeNBs are possible for the UE).

A method in a network node of acting upon detection of dual connectivity mode are described in the following.

The network, e.g. a network node, may be adapted to perform, and/or comprise a corresponding module, and/or may perform, e.g. after and/based on obtaining and/or determining information regarding a maximum receive timing difference seen at the UE and/or whether the UE operates in synchronized or unsynchronized DC mode, e.g. based on one or more methods described herein, any one or any combination of the following:

switching (which may include configuring the UE accordingly) between synchronized and unsynchronized mode of dual connectivity (or vice versa) based on the maximum receive timing difference, e.g., if it is determined, e.g. by being informed o signaled by the UE, that the maximum receive timing diversity or difference is more than or equal to, or less than a threshold, e.g. X µs, where X could be 33 µs as an example.

based on the information indicating the DC mode, deciding to schedule and/or scheduling or configuring the UE differently. For example, depending on the UE information about the unsynchronized DC mode, the network may not schedule the UE to transmit or receive at the $7^{th}$ subframe related to measurement gap.

The network node may store the decision made to MeNB and/or SeNB such that this information can be used later for connecting other UEs in DC manner.

Generally, a network node (e.g. an anchor node) may be adapted to determine, and/or determine and/or comprise a determining module for (e.g., autonomously) determining the DC mode a UE operates in, e.g. by observing signal transmission between UE and network node and/or based on a signal pattern received from the UE. The network node may be adapted to configure, and/or configure, and/or comprise a corresponding configuring module, the UE, and/or or operate the UE, based on and/or according to, the determined DC mode, e.g. by changing the mode and/or changing a band or band combination or carrier or carrier combination of dual connectivity.

A band or band combination may refer to a frequency band or spectrum or to a combination of frequency bands or spectra, respectively.

Figure 3:
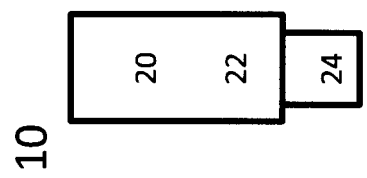
FIG. 3 schematically shows an example for a UE or terminal.

FIG. 3 schematically shows a user equipment 10. User equipment 10 comprises control circuitry 20, which may comprise a controller connected to a memory. Any module of a user equipment may implemented in and/or executable by, user equipment, in particular the control circuitry 20. User equipment 10 also comprises radio circuitry 22 providing receiving and transmitting or transceiving functionality, the radio circuitry 22 connected or connectable to the control circuitry. An antenna circuitry 24 of the user equipment 10 is connected or connectable to the radio circuitry 22 to collect or send and/or amplify signals. Radio circuitry 22 and the control circuitry 20 controlling it are configured for cellular communication with a network on a first cell/carrier and a second cell/carrier and/or for dual connectivity, in particular utilizing E-UTRAN/LTE resources as described herein. The user equipment 10 may be adapted to carry out any of the methods for operating a terminal disclosed herein; in particular, it may comprise corresponding circuitry, e.g. control circuitry. The antenna circuitry and/or radio circuitry may be adapted to provide at least two independent transmitter circuitries and/or at least two independent receiver circuitries, each of which may be associated or associatable to a different node for dual connectivity. The user equipment may be configured or configurable to associate such circuitry to a node, e.g. based on allocation data and/or control data provided by the network and/or a network node, e.g. an anchor node.

FIG. 4 schematically show a network node or base station 100, which in particular may be an eNodeB. Network node 100 comprises control circuitry 120, which may comprise a controller connected to a memory. Any module of a network node, e.g. a receiving module and/or transmitting module and/or control or processing module and/or scheduling module, may be implemented in and/or executable by the network node, in particular the control circuitry 120. The control circuitry 120 is connected to control radio circuitry 122 of the network node 100, which provides receiver and transmitter and/or transceiver functionality. An antenna circuitry 124 may be connected or connectable to radio circuitry 122 for signal reception or transmittance and/or amplification. The network node 100 may be adapted to carry out any of the methods for operating a network node disclosed herein; in particular, it may comprise corresponding circuitry, e.g. control circuitry. It may be considered that the network node 100 is adapted for performing as an anchor node and/or booster node.

Figure 5B:
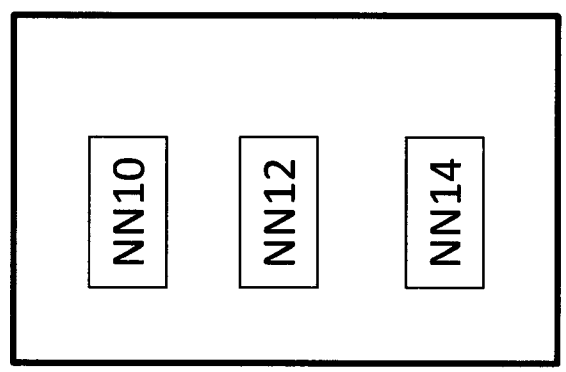
FIGS. 5a and 5b show a method for operating a network node and a network node, respectively.
Figure 5A:
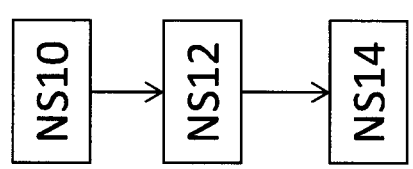

FIG. 5a shows a method for operating a network node in a cellular communication network. The method comprises an action NS10 of observing or estimating, for a user equipment in a dual connectivity operation, a length of a measurement gap (Mg) and/or length of serving cell interruption (Tint) caused by the UE on at least one serving cell. The method also comprises an action NS12 of comparing the Mg and/or Tint with respective thresholds, and an action NS14 of determining whether the UE operates in unsynchronized or synchronized DC mode (operational mode) based on the comparison.

FIG. 5b shows a network node for a cellular communication network. The network node comprises an observing module NN10 performing action NS10. The network node further comprises a comparing module NN12 for performing action NS12. Moreover, the network node comprises a determining module NN14 for performing action NS14.

Figure 6B:
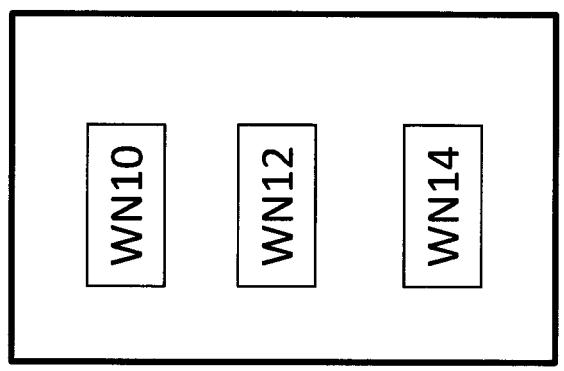
FIGS. 6a and 6b show a method for operating a UE and a UE, respectively.
Figure 6A:
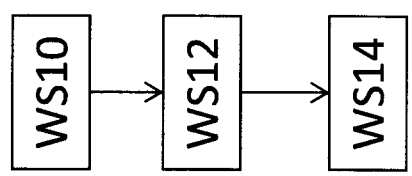

FIG. 6a shows a method for operating a user equipment in dual connectivity operation in a cellular communication network. The method comprises an action WS10 of estimating a maximum received time difference (MRTD) of signals from subframe boundaries of a Master Cell Group (MCG) and a Secondary Cell Group (SCG) at the UE, and an action WS12 of comparing the MRTD with a threshold. Moreover, the method comprises an action WS14 of determining whether the UE operates in unsynchronized or synchronized DC mode based on the comparison of MRTD.

FIG. 6b shows user equipment (UE) for a cellular communication network. The UE comprises an estimating module WN10 for performing action WS10. Moreover, the UE comprises a comparing module WN12 for performing action WS12 and a determining module WN14 for performing action WS14.

In the context of this description, wireless communication may be communication, in particular transmission and/or reception of data, via electromagnetic waves and/or an air interface, in particular radio waves, e.g. in a wireless communication network and/or utilizing a radio access technology (RAT). The communication may involve one or more than one terminal connected to a wireless communication network and/or more than one node of a wireless communication network and/or in a wireless communication network. It may be envisioned that a node in or for communication, and/or in, of or for a wireless communication network is adapted for communication utilizing one or more RATs, in particular LTE/E-UTRA. A communication may generally involve transmitting and/or receiving messages, in particular in the form of packet data.

A message or packet may comprise control and/or configuration data and/or payload data and/or represent and/or comprise a batch of physical layer transmissions. Control and/or configuration data may refer to data pertaining to the process of communication and/or nodes and/or terminals of the communication. It may, e.g., include address data referring to a node or terminal of the communication and/or data pertaining to the transmission mode and/or spectral configuration and/or frequency and/or coding and/or timing and/or bandwidth as data pertaining to the process of communication or transmission, e.g. in a header. Each node or terminal involved in communication may comprise radio circuitry and/or control circuitry and/or antenna circuitry, which may be arranged to utilize and/or implement one or more than one radio access technologies. Radio circuitry of a node or terminal may generally be adapted for the transmission and/or reception of radio waves, and in particular may comprise a corresponding transmitter and/or receiver and/or transceiver, which may be connected or connectable to antenna circuitry and/or control circuitry. Control circuitry of a node or terminal may comprise a controller and/or memory arranged to be accessible for the controller for read and/or write access. The controller may be arranged to control the communication and/or the radio circuitry and/or provide additional services. Circuitry of a node or terminal, in particular control circuitry, e.g. a controller, may be programmed to provide the functionality described herein. A corresponding program code may be stored in an associated memory and/or storage medium and/or be hardwired and/or provided as firmware and/or software and/or in hardware.

A controller may generally comprise a processor and/or microprocessor and/or microcontroller and/or FPGA (Field-Programmable Gate Array) device and/or ASIC (Application Specific Integrated Circuit) device. More specifically, it may be considered that control circuitry comprises and/or may be connected or connectable to memory, which may be adapted to be accessible for reading and/or writing by the controller and/or control circuitry.

Radio access technology may generally comprise, e.g., Bluetooth and/or Wifi and/or WIMAX and/or cdma2000 and/or GERAN and/or UTRAN and/or in particular E-Utran and/or LTE. A communication may in particular comprise a physical layer (PHY) transmission and/or reception, onto which logical channels and/or logical transmission and/or receptions may be imprinted or layered.

A node of a wireless communication network may be implemented as a terminal and/or user equipment and/or network node and/or base station (e.g. eNodeB) and/or relay node and/or any device generally adapted for communication in a wireless communication network, in particular cellular communication.

A wireless communication network or cellular network may comprise a network node, in particular a radio network node, which may be connected or connectable to a core network, e.g. a core network with an evolved network core, e.g. according to LTE. A network node may e.g. be a base station. The connection between the network node and the core network/network core may be at least partly based on a cable/landline connection. Operation and/or communication and/or exchange of signals involving part of the core network, in particular layers above a base station or eNB, and/or via a predefined cell structure provided by a base station or eNB, may be considered to be of cellular nature or be called cellular operation.

A terminal may be implemented as a user equipment; it may generally be considered that a terminal is adapted to provide and/or define an end point of a wireless communication and/or for a wireless communication network. A terminal or a user equipment (UE) may generally be a device configured for wireless device-to-device communication and/or a terminal for a wireless and/or cellular network, in particular a mobile terminal, for example a mobile phone, smart phone, tablet, PDA, etc. A user equipment or terminal may be a node of or for a wireless communication network as described herein, e.g. if it takes over some control and/or relay functionality for another terminal or node. It may be envisioned that terminal or user equipment is adapted for one or more RATs, in particular LTE/E-UTRA. It may be considered that a terminal or user equipment comprises radio circuitry and/control circuitry for wireless communication. Radio circuitry may comprise for example a receiver device and/or transmitter device and/or transceiver device. Control circuitry may include a controller, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry. It may be considered that a terminal or user equipment is configured to be a terminal or user equipment adapted for LTE/E-UTRAN. Generally, a terminal may be adapted to support dual connectivity. It may comprise two independently operable transmitter (or transceiver) circuitries and/or two independently operable receiver circuitries; for dual connectivity, it may be adapted to utilize one transmitter (and/or receiver or transceiver, if provided) for communication with a master network node and one transmitter (and/or receiver or transceiver, if provided) for communication with a secondary network node. It may be considered that a terminal comprises more than two such independently operable circuitries.

A network node or base station, e.g. an eNodeB, may be any kind of base station of a wireless and/or cellular network adapted to serve one or more terminals or user equipments. It may be considered that a base station is a node or network node of a wireless communication network. A network node or base station may be adapted to provide and/or define and/or to serve one or more cells of the network and/or to allocate frequency and/or time resources for communication to one or more nodes or terminals of a network. Generally, any node adapted to provide such functionality may be considered a base station. It may be considered that a base station or more generally a network node, in particular a radio network node, comprises radio circuitry and/or control circuitry for wireless communication. It may be envisioned that a base station or network node is adapted for one or more RATs, in particular LTE/E-UTRA. Radio circuitry may comprise for example a receiver device and/or transmitter device and/or transceiver device. Control circuitry may include a controller, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry. A base station may be arranged to be a node of a wireless communication network, in particular configured for and/or to enable and/or to facilitate and/or to participate in cellular communication, e.g. as a device directly involved or as an auxiliary and/or coordinating node.

Generally, a base station may be arranged to communicate with a core network and/or to provide services and/or control to one or more user equipments and/or to relay and/or transport communications and/or data between one or more user equipments and a core network and/or another base station. A network node or base station may generally be adapted to allocate and/or schedule time/frequency resources of a network and/or one or more cells serviced by the base station. An eNodeB (eNB) may be envisioned as an example of a base station, e.g. according to an LTE standard. It may be considered that a base station is configured as or connected or connectable to an Evolved Packet Core (EPC) and/or to provide and/or connect to corresponding functionality. The functionality and/or multiple different functions of a base station may be distributed over one or more different devices and/or physical locations and/or nodes. A base station may be considered to be a node of a wireless communication network. Generally, a base station may be considered to be configured to be a controlling node and/or coordinating node and/or to allocate resources in particular for cellular communication via one or more than one cell.

It may be considered for cellular communication there is provided at least one uplink (UL) connection and/or channel and/or carrier and at least one downlink (DL) connection and/or channel and/or carrier, e.g. via and/or defining a cell, which may be provided by a network node, in particular a base station or eNodeB. An uplink direction may refer to a data transfer direction from a terminal to a network node, e.g. base station and/or relay station. A downlink direction may refer to a data transfer direction from a network node, e.g. base station and/or relay node, to a terminal. UL and DL may be associated to different frequency resources, e.g. carriers and/or spectral bands. A cell may comprise at least one uplink carrier and at least one downlink carrier, which may have different frequency bands.

A network node, e.g. a base station or eNodeB, may be adapted to provide and/or define and/or control one or more cells, e.g. a group of cells, which may be carrier aggregated (CA) cells. The group of cells may comprise at least one primary cell, which may be considered to be a member of the group and/or to be associated to the group. The cell group may comprise one or more secondary cells (it should be noted that every group may comprise secondary cells, not only a secondary group; the secondary in this context refers to being secondary to the primary cell of a group). A primary cell may be adapted and/or utilised for providing control information (in particular allocation data, and/or scheduling and/or allocation information regarding the primary cell and/or the group of cells to and/or from a terminal connected for communication (transmission and reception) and/or configured with the cell. The control information may pertain to the primary cell and/or the group of cells. Each primary cell and/or the associated group may be associated to a specific network node. A master network node may be adapted to provide and/or service and/or define a primary cell in a master cell group. A secondary network node may be adapted to provide and/or service and/or define a secondary cell group.

A terminal may be adapted to be configured with and/or to communicate via master cell group (at least one primary cell) for communicating with a master network node. Additionally, a terminal may be adapted to be configured with and/or to communicate via secondary cell group (at least one (secondary) primary cell) for communicating with a secondary network node; the terminal may generally be adapted for dual connectivity. The terminal may comprise suitable circuitry, e.g. a first transmitter and/or receiver and/or transceiver circuitry (e.g., for communicating with the master network node) and a second first transmitter and/or receiver and/or transceiver circuitry (e.g., for communicating with the secondary network node/s).

A network node, in particular a base station, and/or a terminal, in particular a UE, may be adapted for communication in spectral bands (frequency bands) licensed and/or defined for LTE.

Resources or communication resources may generally be frequency and/or time resources, which may comprises e.g. frames, subframes, slots, resource blocks, carriers, subcarriers, channels, frequency/spectral bands, etc. Allocated or scheduled resources may comprise and/or refer to frequency-related information, in particular regarding one or more carriers and/or bandwidth and/or subcarriers and/or time-related information, in particular regarding frames and/or slots and/or subframes, and/or regarding resource blocks and/or time/frequency hopping information. Transmitting on allocated resources and/or utilizing allocated resources may comprise transmitting data on the resources allocated, e.g. on the frequency and/or subcarrier and/or carrier and/or timeslots or subframes indicated. It may generally be considered that allocated resources may be released and/or de-allocated. A network or a node of a network, e.g. a network node or allocation node, e.g. a base station, may be adapted to determine and/or transmit corresponding allocation or scheduling data, e.g. data indicating release or de-allocation of resources and/or scheduling of UL and/or DL resources. Accordingly, resource allocation may be performed by the network and/or by a network node; a network node adapted for providing resource allocation/scheduling for one or more than one terminals may be considered to be a controlling node. Resources may be allocated and/or scheduled on a cell level and/or by a network node servicing and/or providing the cell.

Allocation data may be considered to be data indicating and/or granting resources allocated by a network node, e.g. a controlling and/or allocation node, in particular data identifying or indicating which resources are reserved or allocated, e.g. for cellular communication, which may generally comprise transmitting and/or receiving data and/or signals; the allocation data may indicate a resource grant or release and/or resource scheduling. A grant or resource grant may be considered to be one example of allocation data. It may be considered that an allocation node is adapted to transmit allocation data directly to a node and/or indirectly, e.g. via a relay node and/or another node or base station. Allocation data may comprise control data and/or be part of or form a message, in particular according to a pre-defined format, for example a DCI format, which may be defined in a standard, e.g. LTE. In particular, allocation data may comprise information and/or instructions to reserve resources or to release resources, which may already be allocated. A terminal may generally be adapted to perform transmission of data to, e.g. UL data, and/or reception of data from, a network node and/or to more than one network nodes, according to allocation data.

There may be considered a network node adapted for performing any one of the methods for operating a network node and/or anchor node and/or booster node described herein.

There may be considered a user equipment adapted for performing any one of the methods for operating a user equipment described herein.

There is also disclosed a program product comprising code executable by control circuitry, the code causing the control circuitry to carry out and/or control any one of the method for operating a user equipment or network node, e.g. anchor node or booster node, as described herein, in particular if executed on control circuitry, which may be control circuitry of a user equipment or a network node like anchor or booster node as described herein.

Moreover, there is disclosed a carrier medium arrangement carrying and/or storing at least any one of the program products described herein and/or code executable by control circuitry, the code causing the control circuitry to perform and/or control at least any one of the methods described herein. A carrier medium arrangement may comprise one or more carrier media. Generally, a carrier medium may be accessible and/or readable and/or receivable by control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

A user equipment and/or network node may be adapted, and/or comprise a connectivity module for, supporting dual connectivity. For example, a user equipment, and/or its connectivity module, may be adapted to communicate, in particular to transmit and/or receive control and/or scheduling and/or allocation data, with more than one network node, one of which may be an anchor node (which may also be referred to as master network node or master node) and at least one other node may be a booster node (which may also be referred to as secondary network node or secondary node).

An anchor or master network node, and/or its connectivity module, may be adapted to control functionality of a booster or secondary network node in dual connectivity, in particular handover between secondary network node; the master network node, and/or its connectivity module, may be adapted to transmit and/or receive corresponding control signaling to the secondary network node, e.g. via a backhaul and/or communication interface, e.g. a X2 interface. A network node may generally comprise a corresponding backhaul and/or communication interface, which may be an interface to another network node, e.g. a backhaul or interface between an anchor node and a booster node.

It may be considered that the backhaul may be non-ideal, i.e. it may have high latency (high latency may be latency which is too high to perform real-time control and/or to provide synchronized scheduling and/or allocating of resource by the master network node for the communication between the secondary network node and the terminal; alternatively or additionally, high latency may be latency higher than a predetermined high latency threshold value, which may be dependent on the implemented system and/or standard, e.g. LTE).

Alternatively, it may be considered that the backhaul is ideal, allowing (in principle) such kind real-time control. A booster or secondary network node, and/or its connectivity module, may be adapted to receive control information from a master network node, wherein the control information may in particular pertain to a handover involving the booster node, e.g. from another node to the booster node or from the booster node to another node. An anchor or master network node may generally be adapted for a booster or secondary network node functionality, e.g. for another user equipment, and vice versa.

Generally, an anchor node may be a network node. A booster node may be a network node different from, and/or located separately from, the anchor node.

A user equipment or terminal being configured with a cell, e.g. a serving cell, and/or carrier, and/or being connected to a network node via a cell, may be in a state in which it may communicate (transmit and/or receive data, e.g. with the network node) using the cell or carrier, e.g. being registered with the network for communication and/or being synchronized to the cell and/or carrier; in particular, the cell may be activated for the user equipment or terminal and/or the latter may be in an RRC_connected or RRC_idle state regarding the cell or the node providing the cell.

Synchronization information may generally refer to information regarding the time difference between signals from the master network node, e.g. via the MCG, and the secondary network node, e.g. via the SCG, and/or to the time difference between signals received, by the terminal, via the MCG and the SCG, in particular via the respective primary cells (PCell and PSCell).

Synchronization information may refer and/or comprise a synchronization level. A synchronization level may indicate whether the time difference (or its absolute value) lies above a given threshold and/or between given thresholds, e.g. if it is larger than a threshold defining the signals of being synchronized. Generally, a synchronization level may indicate a pre-defined type or mode of synchronization in dual connectivity, as discussed herein. One or more thresholds may be defined as above in terms of types of synchronization. Synchronization information may additionally or alternatively comprise the value and/or absolute value of the time difference.

Configuring a terminal or UE, e.g. by a network or network node, may comprise transmitting, by the network or network node, one or more parameters and/or commands and/or allocation or control data to the terminal or UE, and/or the terminal or UE changing its configuration and/or setup, e.g. based on received parameters and/or commands and/or allocation data from the network and/or the network node.

Control and/or configuration data may refer to data pertaining to the process of communication and/or nodes of the communication. It may, e.g., include address data referring to a node of the communication and/or data pertaining to the transmission mode and/or spectral configuration and/or frequency and/or coding and/or timing and/or bandwidth as data pertaining to the process of communication or transmission, e.g. in a header. Each node involved in such communication may comprise radio circuitry and/or control circuitry and/or antenna circuitry, which may be arranged to utilize and/or implement one or more than one radio access technologies. Radio circuitry of a node may generally be adapted for the transmission and/or reception of radio waves, and in particular may comprise a corresponding transmitter and/or receiver and/or transceiver, which may be connected or connectable to antenna circuitry and/or control circuitry. Control circuitry of a node may comprise a controller and/or memory arranged to be accessible for the controller for read and/or write access. The controller may be arranged to control the communication and/or the radio circuitry and/or provide additional services. Circuitry of a node, in particular control circuitry, e.g. a controller, may be programmed to provide the functionality described herein. A corresponding program code may be stored in an associated memory and/or storage medium and/or be hardwired and/or provided as firmware and/or software and/or in hardware.

A node of a wireless communication network may be implemented as a user equipment and/or base station and/or relay node and/or any device generally adapted for device-to-device communication.

A wireless or cellular network may comprise a network node, in particular a radio network node, which may be connected or connectable to a core network, e.g. a core network with an evolved network core, e.g. according to LTE. The connection between the network node and the core network/network core may be at least partly based on a cable/landline connection. Operation and/or communication and/or exchange of signals involving part of the core network, in particular layers above a base station or eNB, and/or via a predefined cell structure provided by a base station or eNB, may be considered to be of cellular nature or be called cellular operation. Operation and/or communication and/or exchange of signals without involvement of layers above a base station and/or without utilizing a predefined cell structure provided by a base station or eNB, may be considered to be D2D communication or operation, in particular, if it utilises the radio resources, in particular carriers and/or frequencies, and/or equipment (e.g. circuitry like radio circuitry and/or antenna circuitry, in particular transmitter and/or receiver and/or transceiver) provided and/or used for cellular operation.

A network device or node and/or a user equipment may comprise a software/program arrangement arranged to be executable by a hardware device, e.g. control circuitry, and/or storable in a memory, which may provide dual connectivity functionality and/or corresponding control functionality and/or control functionality to carry out any one of the methods described herein and/or to implement any one or more than one functionalities of a user equipment and/or network node described herein.

A receiving operation may comprise a measurement operation, e.g. a signal quality measurement, which may be performed in a measurement gap, in which a receiver switching to a carrier/frequency to be measured may be performed.

A network node, in particular a radio network node, may comprise radio circuitry and/or control circuitry, in particular for wireless communication. Some examples of a network node, which is not a radio network node, may comprise: a core network node, MME, a node controlling at least in part mobility of a wireless device, SON node, O&M node, positioning node, a server, an application server, an external node, or a node comprised in another network. Any network node may comprise control circuitry and/or a memory. A network node may be considered to be serving a node or UE, if it provides a cell of a cellular network to the served node or UE and/or is connected or connectable to the UE via and/or for transmission and/or reception and/or UL and/or DL data exchange or transmission and/or if the network node is adapted to provide the UE with allocation and/or configuration data and/or a measurement performance characteristic and/or to configure the D2D device or UE.

Multiple carrier frequencies or functionality may refer to any of: different carrier frequencies within the same frequency band or within different frequency bands, same PLMN or different PLMNs, same RAT or different RATs. DL and UL carrier frequencies in FDD are also examples of different carrier frequencies.

A frequency band herein may be FDD, TDD, HD-FDD, or unidirectional (e.g., DL-only band such as Band 29, in some examples). Multiple carrier functionality may include carrier aggregation functionality, in which multiple carriers or cells are used for transmission and/or reception between two participants of communication. The carriers may be continuous in the spectrum or discontinuous.

Each or any one of the network nodes or user equipments shown in the figures may be adapted to perform the methods to be carried out by a user equipment described herein. Alternatively or additionally, each or any of the user equipments shown in the figures may comprise any one or any combination of the features of a user equipment described herein. Each or any one of the network nodes, e.g. anchor node or booster node, or controlling nodes or eNBs or base stations shown in the figures may be adapted to perform the methods to be carried out by network node or base station described herein. Alternatively or additionally, the each or any one of the controlling or network nodes or eNBs or base stations shown in the figures may comprise any one or any one combination of the features of a network node or eNB or base station described herein.

Observing and/or estimating a value or parameter (and/or related information) may comprise and/or be based on determining corresponding information, e.g. one or more parameters and/or measurement values. Such determining (and/or observing and/or estimating) may comprise performing one or more measurements, and/or be based on the results of one or more measurements. Estimating and/or observing and/or determining generally may comprise performing one or more evaluations (e.g., including one or more calculations for example summing/subtracting values, and/or averaging and/or weighting, etc.), for example such evaluations as described herein in the context of the different examples of determining MRTD or Tint or Mg.

A measurement gap may refer to a time gap or interval, in which no transmission and reception happens, in particular regarding a serving cell or a given carrier. Since there is no signal transmission and reception during the gap (at least in the serving cell or given carrier), a terminal or UE can switch to another or a target cell or carrier and/or perform a measurement on the target cell or carrier, e.g. for signal quality, utilizing the same receiver. A measurement may generally be configured (and/or be provided) by a network node, which may comprise a corresponding measurement module, and/or be performed for such configuring. Providing a measurement gap may comprise not transmitting during the gap. Configuring a UE for a measurement gap may comprise informing the UE about an (or more than one) measurement gap (in particular, an upcoming or scheduled on, e.g. in DL), and/or configuring the UE for not transmitting during the measurement gap. It is noted that a measurement gap is usually UE and/or cell and/or transmitter-specific. In particular, a measurement gap may be configured for one or more cells of one of the network nodes involved in dual connectivity for a UE, whereas other UEs still may be able and/or scheduled to transmit during the gap, and/or the other node involved in dual connectivity is able or scheduled to transmit during the gap.

The term "intra-frequency" may refer to issued related to the same frequency/bandwith and/or carrier, e.g. between neighboring cells (which may be provided by different BSs) having the same frequencies available. The term "inter-frequency" may refer to issues related to different frequencies/bandwidths and/or carriers, e.g. between different carriers in a multi-carrier arrangement.

A receiving operation may comprise a measurement operation, e.g. a signal quality measurement, which may be performed in a measurement gap, in which a receiver switching to a carrier/frequency to be measured may be performed.

Service cell interruption may generally pertain to the UE not being able to transmit and/or receive in the interrupted cell, in particular due to switching its receiving and/or transmitting circuitry, e.g. when performing a measurement, and/or during and/or related to a measurement gap.

Abbreviation Explanation

CCA Clear Channel Assessment
DCI Downlink Control Information
DL Downlink
DMRS Demodulation Reference Signals
TTI Transmission-Time Interval
UE User Equipment
UL Uplink
LA Licensed Assisted
LA Licensed Assisted Access
DRS Discovery Reference Signal
SCell Secondary Cell
SRS Sounding Reference Signal
LBT Listen-before-talk
PCFICH Physical Control Format Indicator Channel
PDCCH Physical Downlink Control Channel
PUSCH Physical Uplink Shared Channel
PUCCH Physical Uplink Control Channel
RRM Radio Resource Management
CIS Transmission Confirmation Signal
3GPP 3$^{rd}$ Generation Partnership Project
Ack/Nack Acknowledgment/Non-Acknowledgement, also A/N
AP Access point
B1, B2, . . . Bn Bandwidth of signals, in particular carrier bandwidth Bn assigned to corresponding carrier or frequency f1, f2, . . . , fn
BER/BLER Bit Error Rate, BLock Error Rate;
BS Base Station
CA Carrier Aggregation
CC component carrier (a carrier in a carrier aggregate)
CoMP Coordinated Multiple Point Transmission and Reception
CQI Channel Quality Information
CRS Cell-specific Reference Signal
CSI Channel State Information
CSI-RS CSI reference signal
D2D Device-to-device
DL Downlink
EPDCCH Enhanced Physical DL Control CHannel
DL Downlink; generally referring to transmission of data to a node/into a direction further away from network core (physically and/or logically); in particular from a base station or eNodeB to a D2D enabled node or UE; often uses specified spectrum/bandwidth different from UL (e.g. LTE)
eNB evolved NodeB; a form of base station, also called eNodeB
E-UTRA/N Evolved UMTS Terrestrial Radio Access/Network, an example of a RAT
f1, f2, f3, . . . , fn carriers/carrier frequencies; different numbers may indicate that the referenced carriers/frequencies are different
f1_UL, . . . , fn_UL Carrier for Uplink/in Uplink frequency or band
f1_DL, . . . , fn_DL Carrier for Downlink/in Downlink frequency or band
FDD Frequency Division Duplexing
ID Identity
L1 Layer 1
L2 Layer 2
LTE Long Term Evolution, a telecommunications standard
MAC Medium Access Control
MBSFN Multiple Broadcast Single Frequency Network
MDT Minimisation of Drive Test
MME Mobility Management Entity; a control entity of a wireless communication network (LTE) providing control functionality e.g. for radio network nodes like eNBs NW Network
OFDM Orthogonal Frequency Division Multiplexing
O&M Operational and Maintenance
OSS Operational Support Systems
PC Power Control
PCell Primary Cell (e.g. in CA, in particular a primary cell of a Master Cell Group)
PDCCH Physical DL Control CHannel
PH Power Headroom
PHR Power Headroom Report
Pscell primary cell of a secondary cell group
PSS Primary Synchronization Signal
PUSCH Physical Uplink Shared CHannel
R1, R2, . . . , Rn Resources, in particular time-frequency resources, in particular assigned to corresponding carrier f1, f2, fn
RA Random Access
RACH Random Access Channel
RAN Radio Access Network
RAT Radio Access Technology
RE Resource Element
RB Resource Block
RRH Remote radio head
RRM Radio Resource Management
RRU Remote radio unit
RSRQ Reference signal received quality
RSRP Reference signal received power
RSSI Received signal strength indicator
RX reception/receiver, reception-related SA Scheduling Assignment
SCell Secondary Cell (e.g. in CA)
SINR/SNR Signal-to-Noise-and-Interference Ratio; Signal-to-Noise Ratio
SFN Single Frequency Network
SON Self Organizing Network
SSS Secondary Synchronization Signal
TPC Transmit Power Control
TX transmission/transmitter, transmission-related
TDD Time Division Duplexing
UE User Equipment
UL Uplink; generally referring to transmission of data to a node/into a direction closer to a network core (physically and/or logically); in particular from a D2D enabled node or UE to a base station or eNodeB; in the context of D2D, it may refer to the spectrum/bandwidth utilized for transmitting in D2D, which may be the same used for UL communication to a eNB in cellular communication; in some D2D variants, transmission by all devices involved in D2D communication may in some variants generally be in UL spectrum/bandwidth/carrier/frequency
DC Dual Connectivity
MCG Main Cell Group
SCG Secondary Cell Group
PCell Primary Cell
PSCell Primary SCell
SCell Secondary Cell
RACH Random Access CHannel
MeNB Master eNodeB
SeNB Secondary eNodeB
pSCell Primary SCell
PCC Primary component carrier
PCI Physical cell identity
PSS Primary synchronization signal
RAT Radio Access Technology
RRC Radio resource control
RSCP Received signal code power
RSRP Reference Signal Received Power
RSRQ Reference Signal Received Quality
RSSI Received signal strength indication
SCC Secondary component carrier
SIB System information block
SON Self-organizing networks
SSS Secondary synchronization signal
TDD Time division duplex
UARFCN UMTS Absolute Radio Frequency Channel Number
HO Handover
UE User equipment
RNC Radio Network Controller
BSC Base station Controller
PCell Primary Cell
SCell Secondary Cell These and other abbreviations may be used according to LTE standard definitions.

In this description, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other embodiments and variants that depart from these specific details. For example, the concepts and variants are partially described in the context of Long Term Evolution (LTE) or LTE-Advanced (LTE-A) mobile or wireless communications technologies; however, this does not rule out the use of the present concepts and aspects in connection with additional or alternative mobile communication technologies such as the Global System for Mobile Communications (GSM). While the following embodiments will partially be described with respect to certain Technical Specifications (TSs) of the Third Generation Partnership Project (3GPP), it will be appreciated that the present concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the embodiments described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. Because the aspects presented herein can be varied in many ways, it will be recognized that any scope of protection should be defined by the scope of the claims that follow without being limited by the description.

The invention claimed is:

1. A method for operating a network node in a cellular communication network, the method comprising:
observing or estimating, for a user equipment (UE) in a dual connectivity (DC) operation, a length of a measurement gap (Mg) and/or a length of a serving cell interruption (Tint) caused by the UE on at least one serving cell, wherein observing or estimating the length of the measurement gap (Mg) comprises causing the UE to create autonomous gaps by configuring the UE to acquire system information, SI of a target cell and scheduling the UE to transmit in a subframe before and a subframe after each gap, and wherein observing or estimating the length of the Tint comprises scheduling the UE to receive downlink data in every downlink subframe;
comparing the Mg and/or the Tint with a respective threshold, wherein comparing the length of the Mg comprises determining whether the network node receives UE transmitted signals in both scheduled subframes, and wherein comparing the Tint comprises observing the number of DL frames for which the network node receives acknowledgement/non acknowledgement (ACK/NACK) feedback from the UE, wherein the number of subframes with missed ACK/NACK corresponds to Tint; and
determining whether the UE operates in unsynchronized or synchronized DC mode based on the comparison, wherein it is determined that the UE operates in synchronized DC mode if its determined that the network node receives UE transmitted signals in both scheduled subframes, and wherein it is determined that the UE operates in synchronized DC mode if the length of the Tint is 1 subframe.

2. A network node configured for a cellular communication network, the network node comprising:
 radio circuitry configured for communicating with a user equipment (UE); and
 control circuitry operatively associated with the radio circuitry and configured to:
  observe or estimate, for the UE in a dual connectivity (DC) operation, a length of a measurement gap (Mg) and/or a length of a serving cell interruption (Tint) caused by the UE on at least one serving cell, wherein the length of the measurement gap (Mg) is observed or estimated by causing the UE to create autonomous gaps by configuring the UE to acquire system information, SI of a target cell and scheduling the UE to transmit in a subframe before and a subframe after each gap, and wherein the length of the Tint is observed or estimated by scheduling the UE to receive downlink data in every downlink subframe;
  compare the Mg and/or the Tint with a respective threshold, wherein the length of the Mg is compared by determining whether the network node receives UE transmitted signals in both scheduled subframes, and wherein the Tint is compared by observing the number of DL frames for which the network node receives acknowledgement/non acknowledgement (ACK/NACK) feedback from the UE, wherein the number of subframes with missed ACK/NACK corresponds to Tint; and
  determine whether the UE operates in unsynchronized or synchronized DC mode based on the comparison, wherein it is determined that the UE operates in synchronized DC mode if its determined that the network node receives UE transmitted signals in both scheduled subframes, and wherein it is determined that the UE operates in synchronized DC mode if the length of the Tint is 1 subframe.

3. A non-transitory computer readable medium storing a computer program comprising code executable by control circuitry of a network node in a cellular communication network, the code causing the control circuitry to:
 observe or estimate, for a user equipment (UE) in a dual connectivity (DC) operation, a length of a measurement gap (Mg) and/or a length of a serving cell interruption (Tint) caused by the UE on at least one serving cell, wherein the length of the measurement gap (Mg) is observed or estimated by causing the UE to create autonomous gaps by configuring the UE to acquire system information, SI of a target cell and scheduling the UE to transmit in a subframe before and a subframe after each gap, and wherein the length of the Tint is observed or estimated by scheduling the UE to receive downlink data in every downlink subframe;
 compare the Mg and/or the Tint with a respective threshold, wherein the length of the Mg is compared by determining whether the network node receives UE transmitted signals in both scheduled subframes, and wherein the Tint is compared by observing the number of DL frames for which the network node receives acknowledgement/non acknowledgement (ACK/NACK) feedback from the UE, wherein the number of subframes with missed ACK/NACK corresponds to Tint; and
 determine whether the UE operates in unsynchronized or synchronized DC mode based on the comparison, wherein it is determined that the UE operates in synchronized DC mode if its determined that the network node receives UE transmitted signals in both scheduled subframes, and wherein it is determined that the UE operates in synchronized DC mode if the length of the Tint is 1 subframe.

* * * * *